United States Patent
Nakayama

(10) Patent No.: US 9,511,776 B2
(45) Date of Patent: Dec. 6, 2016

(54) LOCUS ESTIMATION DEVICE AND LOCUS ESTIMATING METHOD

(71) Applicant: FUJITSU LIMITED, Kawasaki-shi, Kanagawa (JP)

(72) Inventor: Osafumi Nakayama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/609,087

(22) Filed: Jan. 29, 2015

(65) Prior Publication Data

US 2015/0251662 A1    Sep. 10, 2015

(30) Foreign Application Priority Data

Mar. 6, 2014    (JP) ................. 2014-044410

(51) Int. Cl.
*G05D 1/00*        (2006.01)
*G05D 3/00*        (2006.01)
(Continued)

(52) U.S. Cl.
CPC ........ *B60W 40/10* (2013.01); *B60W 30/18145* (2013.01); *B60W 2050/0034* (2013.01); *B60W 2520/14* (2013.01); *B60W 2520/28* (2013.01)

(58) Field of Classification Search
CPC ......... B60W 30/18127; B60W 10/08; B60W 40/072; B60W 10/20; B60W 10/22; B60W 10/16; B60W 10/14; B60W 30/143; B60W 30/04; B60W 2520/125; B60W 2520/14; B60W 2520/28; B60W 2540/04; B60W 2540/18; B60W 2540/26; B60W 30/18145; B60T 2201/024; B60T 2230/02; B60T 2260/02; B60T 2260/06; B60T 8/1755; B60T 8/17552; B60R 21/01516; B60R 21/01538; B60R 21/0134; B60R 21/01552

USPC ........ 701/70, 38, 1, 83, 91, 37, 27, 532, 42, 701/400, 79, 85, 41, 69, 22, 36, 45, 82, 89,701/50; 180/197, 411, 167, 168, 421, 22, 180/271, 248, 408, 233; 340/461, 937, 440, 340/429, 932.2
See application file for complete search history.

(56) References Cited

U.S. PATENT DOCUMENTS

| | | | |
|---|---|---|---|
| 5,099,940 A | 3/1992 | Imaseki et al. | |
| 6,704,653 B2 * | 3/2004 | Kuriya | B62D 15/0275 340/425.5 |

(Continued)

FOREIGN PATENT DOCUMENTS

| | | |
|---|---|---|
| DE | 102004010540 A1 | 9/2005 |
| DE | 102005006965 A1 | 9/2005 |

(Continued)

OTHER PUBLICATIONS

Extended European search report (EESR) dated Jul. 6, 2015 for corresponding European patent application No. 15152657.1.

*Primary Examiner* — Calvin Cheung
*Assistant Examiner* — Luis A Martinez Borrero
(74) *Attorney, Agent, or Firm* — Fujitsu Patent Center

(57) ABSTRACT

A processor of a locus estimation device accepts a measured value of a wheel speed of right and left front wheels of a moving object, and a measured value of a steering angle at which the traveling direction is changed. Based on a measured value of a wheel speed of the right and left front wheels, a measured value of a steering angle, a distance in the direction of the body of the moving object, a distance in the direction of the axle of the moving object, and a constant, the processor estimates an amount of rotation of the middle point of a rotation center of the right and left rear wheels on a circle having a center which is a point on a straight line passing through the rotation center of the right and left rear wheels, and an amount of translation of the middle point.

13 Claims, 28 Drawing Sheets

(51) Int. Cl.
*G06F 7/00* (2006.01)
*G06F 17/00* (2006.01)
*B60W 40/10* (2012.01)
*B60W 30/18* (2012.01)
*B60W 50/00* (2006.01)

(56) References Cited

U.S. PATENT DOCUMENTS

| | | | | |
|---|---|---|---|---|
| 7,039,504 B2* | 5/2006 | Tanaka | | B62D 15/0285 318/587 |
| 7,418,327 B2* | 8/2008 | Pelchen | | B60W 30/045 180/234 |
| 7,661,507 B2* | 2/2010 | Yamazaki | | B62D 6/008 180/446 |
| 7,813,855 B2* | 10/2010 | Watanabe | | B62D 15/0285 180/204 |
| 7,822,563 B2* | 10/2010 | Matsuda | | B60W 30/02 180/172 |
| 7,969,326 B2* | 6/2011 | Sakakibara | | B62D 15/0275 340/932.2 |
| 7,970,516 B2* | 6/2011 | Matsumoto | | B60T 8/173 280/5.5 |
| 8,082,081 B2* | 12/2011 | Matsumoto | | B60W 10/06 701/36 |
| 8,154,426 B2* | 4/2012 | Endo | | B62D 15/027 340/436 |
| 8,200,392 B2* | 6/2012 | Kodaira | | B62D 5/0472 701/41 |
| 8,401,714 B2* | 3/2013 | Inou | | B60W 30/10 701/1 |
| 8,489,252 B2* | 7/2013 | Inou | | A61B 5/18 701/1 |
| 8,510,007 B2* | 8/2013 | Mori | | B60K 6/48 180/65.21 |
| 8,706,402 B2* | 4/2014 | Suzuki | | B60W 30/18009 701/23 |
| 2001/0026317 A1* | 10/2001 | Kakinami | | B60Q 9/005 348/148 |
| 2002/0084916 A1* | 7/2002 | Shimizu | | B60Q 9/005 340/932.2 |
| 2002/0097040 A1* | 7/2002 | Takizawa | | B60T 8/171 324/174 |
| 2002/0104700 A1* | 8/2002 | Shimazaki | | B60R 1/00 180/204 |
| 2004/0267423 A1* | 12/2004 | Iwazaki | | B62D 15/0285 701/41 |
| 2005/0090950 A1* | 4/2005 | Sawamoto | | G08G 1/166 701/23 |
| 2007/0067085 A1* | 3/2007 | Lu | | B60T 8/172 701/70 |
| 2007/0146166 A1* | 6/2007 | Sato | | B62D 15/028 340/932.2 |
| 2007/0191997 A1* | 8/2007 | Isaji | | B60T 7/22 701/1 |
| 2008/0059037 A1* | 3/2008 | Isaji | | B60W 40/072 701/93 |
| 2008/0154464 A1* | 6/2008 | Sasajima | | B62D 15/0285 701/42 |
| 2009/0234537 A1* | 9/2009 | Tomida | | B60G 17/0162 701/38 |
| 2010/0066515 A1* | 3/2010 | Shimazaki | | B60W 50/14 340/435 |
| 2010/0235035 A1* | 9/2010 | Nishira | | B60T 7/22 701/31.4 |
| 2010/0246900 A1* | 9/2010 | Ge | | G01B 11/272 382/107 |
| 2010/0262317 A1* | 10/2010 | Suzuki | | B60W 30/18 701/1 |
| 2012/0221222 A1* | 8/2012 | Anderson | | B60W 40/10 701/90 |
| 2013/0210453 A1* | 8/2013 | Shirai | | H04W 64/006 455/456.1 |
| 2014/0104101 A1* | 4/2014 | Mizuochi | | G01C 21/165 342/357.3 |
| 2014/0145498 A1* | 5/2014 | Yamakado | | B60T 8/1755 303/3 |
| 2015/0258989 A1* | 9/2015 | Okano | | H04N 7/18 701/1 |

FOREIGN PATENT DOCUMENTS

| | | |
|---|---|---|
| DE | 102007008624 A1 | 8/2008 |
| EP | 2208654 A1 | 7/2010 |
| JP | 3-090482 | 4/1991 |
| JP | 7-081609 | 3/1995 |
| JP | 2001-138941 | 5/2001 |
| JP | 2002-362390 | 12/2002 |
| JP | 2011-008385 | 1/2011 |
| WO | 2005/085042 A1 | 9/2005 |

* cited by examiner

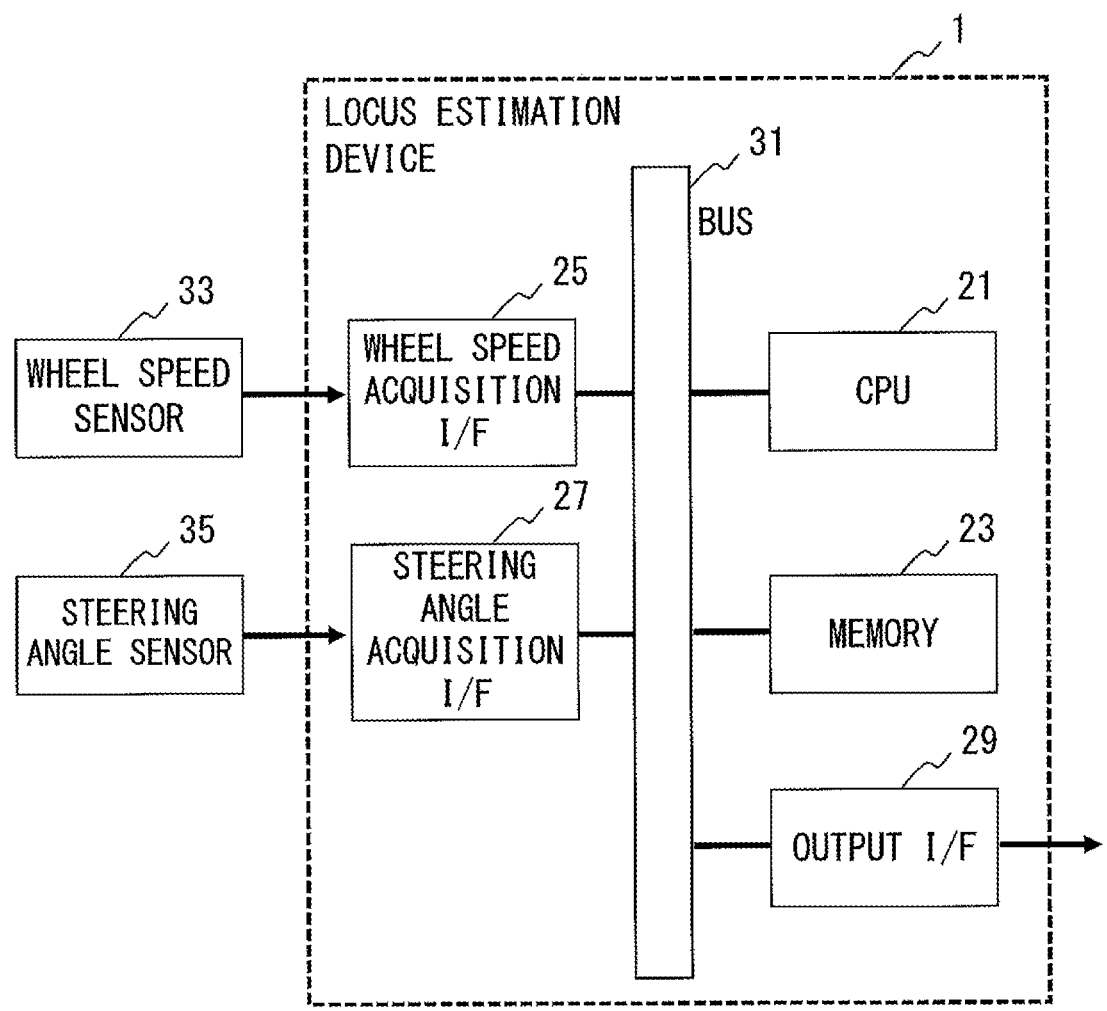
F I G. 2

110

| CONTENTS | SIGN | VALUE |
|---|---|---|
| DISTANCE BETWEEN RIGHT AND LEFT WHEELS / 2 | T | REAL NUMBER (m) |
| DISTANCE BETWEEN FRONT AND REAR WHEELS | L | REAL NUMBER (m) |
| CONSTANT | $\mu$ | REAL NUMBER (RADIAN) |

F I G. 3

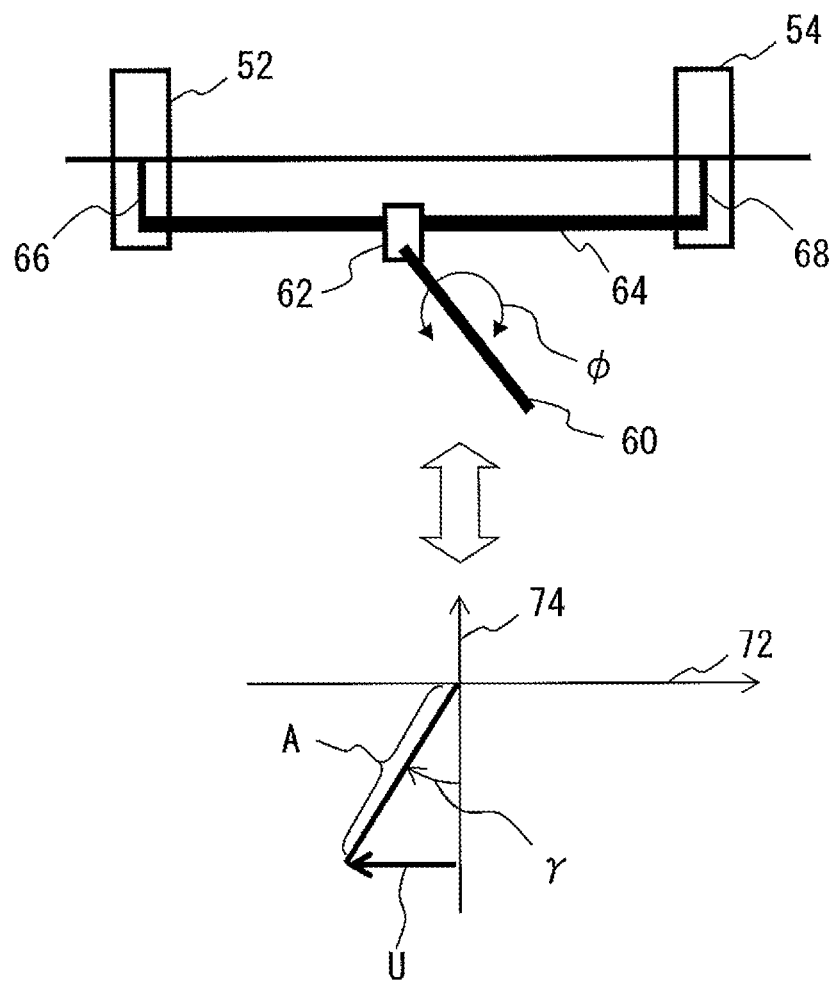
F I G. 5

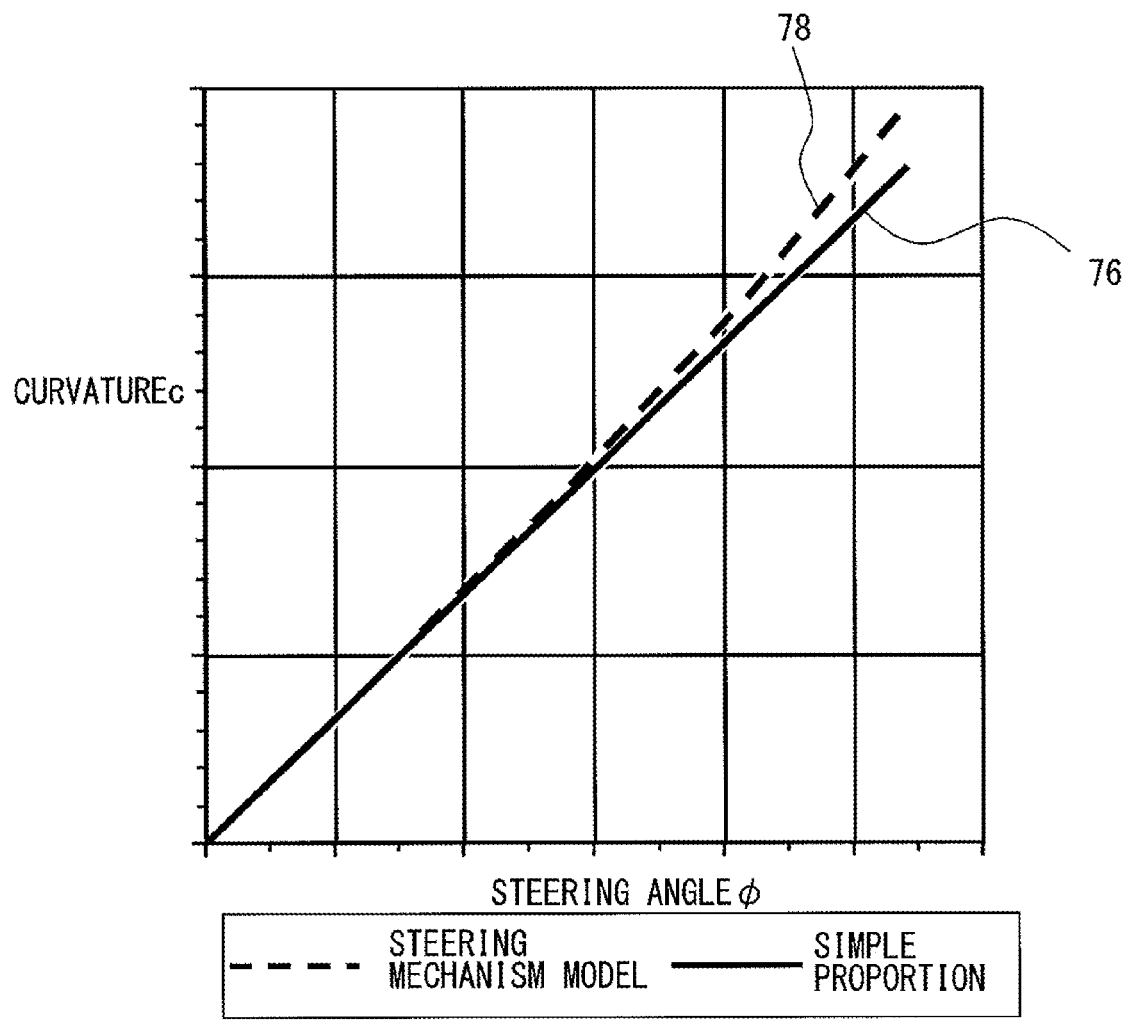
F I G. 6

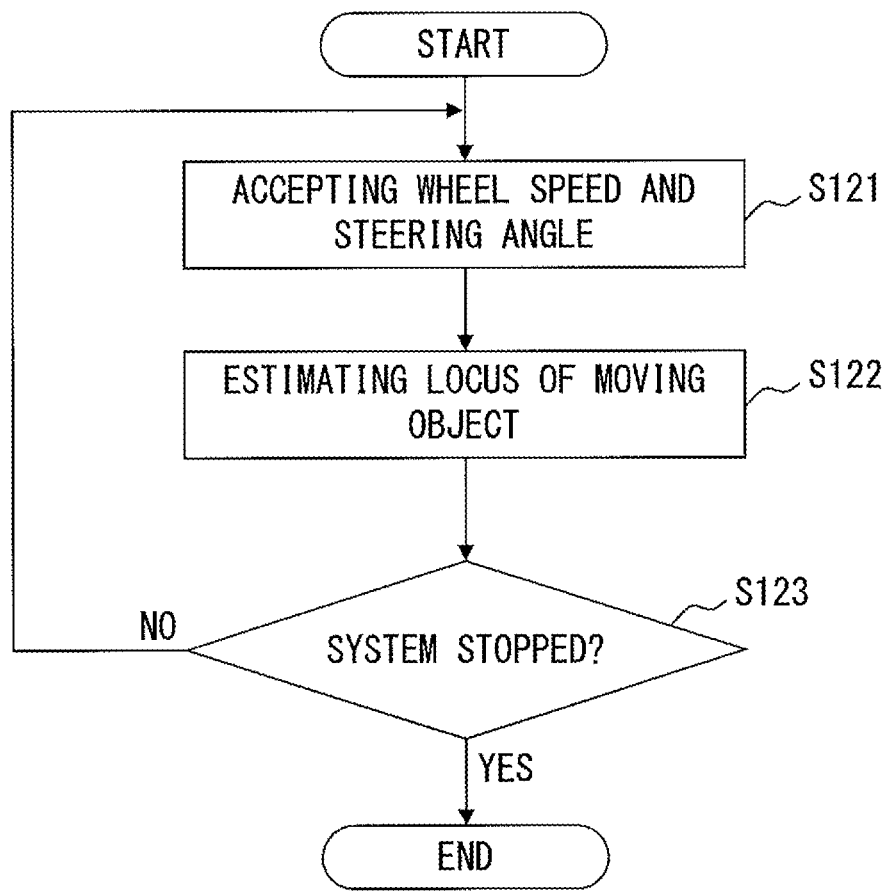
F I G. 9

182

| CONTENTS | SIGN | VALUE |
|---|---|---|
| MOVEMENT JUDGMENT THRESHOLD | TH1 | REAL NUMBER (km/h) |
| MOVEMENT FREQUENCY THRESHOLD | TH2 | INTEGER |
| ROTATION JUDGMENT THRESHOLD | TH$\omega$ | REAL NUMBER (DEGREES) |
| REFERENCE TIME UPDATE THRESHOLD | THK | REAL NUMBER (cm) |

F I G. 1 1

184

| CONTENTS | SIGN | VALUE |
|---|---|---|
| CUMULATIVE LEFT WHEEL SPEED | CUMVL | REAL NUMBER (m/s) |
| CUMULATIVE RIGHT WHEEL SPEED | CUMVR | REAL NUMBER (m/s) |
| STOP COUNTER | SCOUNT | INTEGER |
| STOP FLAG | STOP_F | 0 OR 1 |
| CUMULATIVE STEERING ANGLE AMOUNT | CUM$\phi$ | REAL NUMBER (DEGREES) |
| ACCUMULATION FREQUENCY | N$\phi$ | REAL NUMBER |

| CONTENTS | SIGN | VALUE |
|---|---|---|
| PRIOR TIME ROTATION AMOUNT | $\alpha p$ | REAL NUMBER (DEGREES) |
| PRIOR TIME X TRANSLATION AMOUNT | $qxp$ | REAL NUMBER (m) |
| PRIOR TIME Y TRANSLATION AMOUNT | $qyp$ | REAL NUMBER (m) |

F I G. 1 3

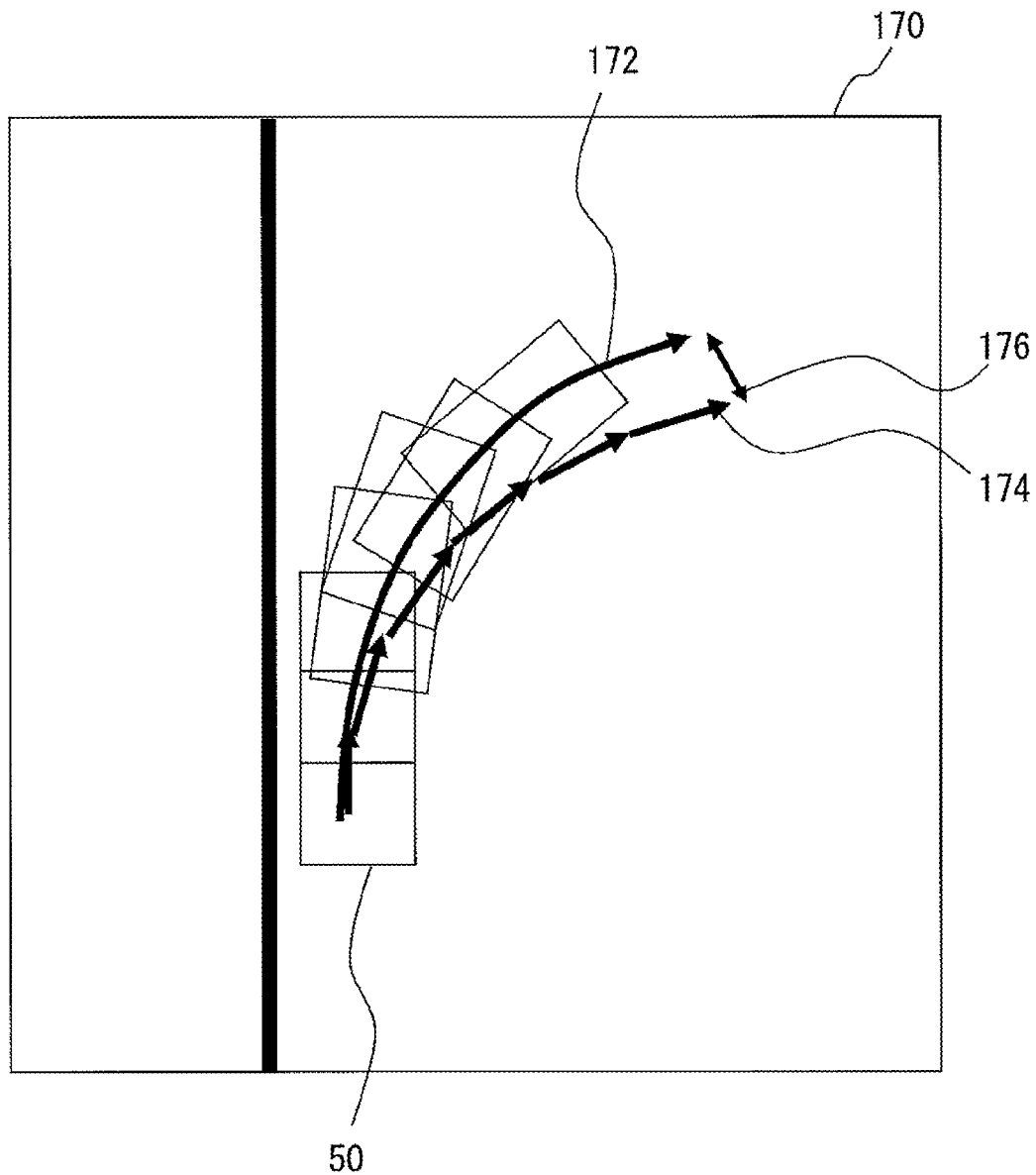
F I G. 14

275

| CONTENTS | SIGN | VALUE |
|---|---|---|
| MOVEMENT JUDGMENT THRESHOLD | TH1 | REAL NUMBER (km/h) |
| MOVEMENT FREQUENCY THRESHOLD | TH2 | INTEGER |
| ROTATION JUDGMENT THRESHOLD | THω | REAL NUMBER (DEGREES) |
| REFERENCE TIME UPDATE THRESHOLD | THK1 | REAL NUMBER (cm) |
| CUMULATIVE WHEEL SPEED DIFFERENCE THRESHOLD | THK2 | REAL NUMBER (cm) |

FIG. 23

LOCUS ESTIMATION DEVICE AND LOCUS ESTIMATING METHOD

CROSS-REFERENCE TO RELATED APPLICATION

This application is based upon and claims the benefit of priority of the prior Japanese Patent Application No. 2014-044410, filed on Mar. 6, 2014, the entire contents of which are incorporated herein by reference.

FIELD

The embodiments discussed herein are related to a locus estimation device, a locus estimating method, and a program.

BACKGROUND

Recently, a technology of estimating a movement or a movement locus of a vehicle according to wheel speed information for a moving object such as a vehicle having right and left front wheels and right and left rear wheels, with the front wheels designed as steered wheels, has been proposed. For example, a technology of preventing a shift of a movement locus for automatic parking, and a technology of making an amendment for matching between an estimated drive locus and an actual drive locus although a driving condition of a vehicle changes, are well known (refer to patent documents 1 and 2, for example). A technology of geometrically estimating a movement locus of a moving object according to wheel speed information has also been proposed (refer to patent documents 3 through 5, for example).

Patent Document 1: Japanese Laid-open Patent Publication No. 2001-138941
Patent Document 2: Japanese Laid-open Patent Publication No. 2002-362390
Patent Document 3: Japanese Laid-open Patent Publication No. 2011-8385
Patent Document 4: Japanese Laid-open Patent Publication No. 7-81609
Patent Document 5: Japanese Laid-open Patent Publication No. 3-90482

SUMMARY

According to an aspect of the embodiments, a locus estimation device includes a storage device and a processor. The storage device stores the distance between right and left front wheels and right and left rear wheels provided behind the right and left front wheels in the moving object in the traveling direction of the moving object. The storage device also stores the distance between the right and left front wheels and a constant depending on the steering angle and the rotation radius of the moving object determined by the steering angle. The processor is configured to accept a measured value of a wheel speed of the right and left front wheels and a measured value of a steering angle which changes the traveling direction of the moving object and estimate as follows on the basis of the measured value of the speed of the right and left front wheels, the measured value of the steering angle, the distance from the front and the end of the moving object, the distance from the sides of the moving object, and the constant. That is, the processor estimates an amount of rotation of the middle point of the rotation center of right and left rear wheels on a circle having a center which is a point on a straight line passing through the rotation center of the right and left rear wheels, and the amount of translation of the middle point.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an example of a hardware configuration of the locus estimation device according to the first embodiment of the present invention;

FIG. 3 is an example of a parameter table according to the first embodiment of the present invention;

FIG. 5 is an example of a steering mechanism model according to the first embodiment of the present invention;

FIG. 6 illustrates the relationship between a front wheel direction angle and curvature according to the first embodiment of the present invention;

FIG. 9 is a flowchart of the operation of a locus estimation device according to the first embodiment of the present invention;

FIG. 11 is an example of a threshold table according to the second embodiment of the present invention;

FIG. 12 is an example of a cumulative measured value table according to the second embodiment of the present invention;

FIG. 13 is an example of a prior time locus table according to the second embodiment of the present invention;

FIG. 14 is an explanatory illustration of the influence of accumulated error;

FIG. 23 is an example of a threshold table according to the third embodiment of the present invention;

DESCRIPTION OF EMBODIMENTS

Many recent vehicles are front-wheel driven. Therefore, the front wheel speed is measured in many cases. In this case, when the movement of a moving object is estimated by considering its steering angle, it is preferable that movement of the middle point of two rear wheels is estimated.

However, in the above-mentioned conventional technology, there may be a case where movement of a front-wheel driven vehicle is not estimated with high accuracy because, for example, the direction of the vehicle is not appropriately considered on the basis of circular movement of the vehicle, an estimation is made by means of an equation using the wheel speeds of the front and rear wheels, thereby invalidating a measured value of front wheel speed to be adopted, etc.

The above-mentioned problems occur not only with a vehicle, but also with other moving objects having wheels.

Figure 1:
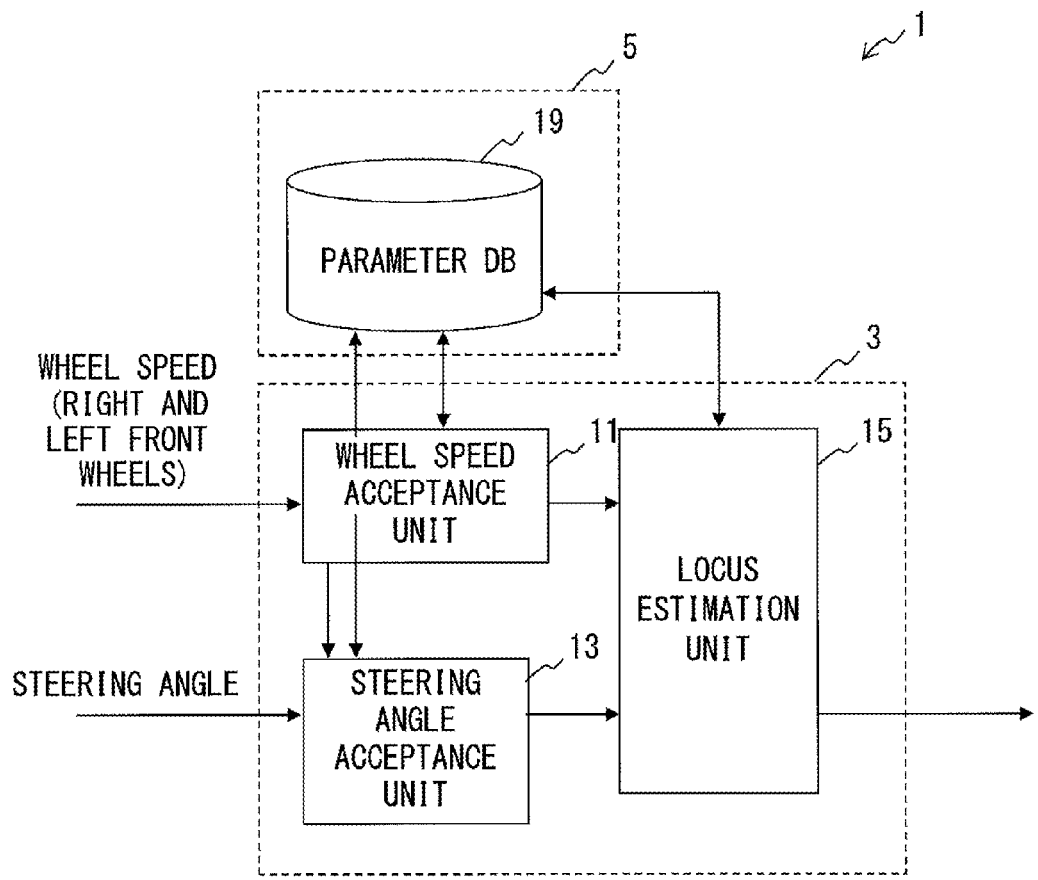
FIG. 1 is an example of a functional configuration of the locus estimation device according to a first embodiment of the present invention.

(First embodiment) A locus estimation device 1 according to a first embodiment is described below with reference to the attached drawings. FIG. 1 is an example of a functional configuration of the locus estimation device 1 according to the first embodiment of the present invention. FIG. 2 is an example of a hardware configuration of the locus estimation device 1 according to the first embodiment of the present invention. The locus estimation device 1 is an apparatus that estimates a locus of a moving object with right and left front wheels and right and left rear wheels. The locus estimation device 1 estimates a locus of a moving object on the basis of a measured value of the wheel speed of each of the right and left front wheels and a measured value of the steering angle of the front wheels. Front wheels refer to wheels provided at the front of the moving object. Rear wheels refer to wheels provided at the rear of the moving object. Left and right refer to the direction viewed from the end to the front of the moving object. The steering angle refers to the turning angle of a steering wheel which changes the direction of the front wheels with respect to the direction of the body of the moving object.

The locus estimation device 1 estimates the locus on the basis of the wheel speed of the right and left front wheels, the steering angle, the distance between the front wheels and the rear wheels in the direction of the body of the moving object, the distance between the right and left front wheels, and the constant depending on the steering angle and the rotation radius of the moving object at the steering angle. In this case, the locus estimation device 1 estimates the amount of rotation of the middle point of the rotation center of the right and left rear wheels on a circle having a center which is a point on a straight line passing through the rotation center of the right and left rear wheels, and the amount of translation of the middle point. Thus, the locus of the moving object is estimated.

Described below is a case where a vehicle having two front wheels and two rear wheels is used as a moving object. With regard to the vehicle, it is assumed that the wheel speed of each of the right and left front wheels (hereafter also referred to respectively as left wheel speed and right wheel speed) and a steering angle are measured. The locus estimation device 1 may be a small information processing device such as a microcomputer etc., and may be installed in the vehicle.

As illustrated in FIG. 2, the locus estimation device 1 includes a central processing unit (CPU) 21, memory 23, a wheel speed acquisition interface (I/F) 25, a steering angle acquisition I/F 27, and an output I/F 29, and these components are interconnected through a bus 31.

The CPU 21 is a processor which controls the operation of the locus estimation device 1. The CPU 21 performs a controlling process as the locus estimation device 1 by reading and executing a control program stored in advance in, for example, the memory 23. The memory 23 is, for example, a read-only storage device, a storage device allowing writing and reading of data at any time, etc. The wheel speed acquisition I/F 25 is an interface device which performs management when accepting the wheel speed of each of the right and left front wheels from a wheel speed sensor 33. The steering angle acquisition I/F 27 is an interface device which performs management when accepting from a steering angle sensor 35 a turning angle of a steering wheel which changes the direction of the front wheels of the vehicle. The output I/F 29 is an interface device which performs management when outputting a locus estimation result.

The wheel speed sensor 33 is provided for a vehicle, and outputs a measured value of the wheel speed of each of the right and left front wheels. The wheel speed refers to, for example, a rotation movement distance per unit time of a wheel. The steering angle sensor 35 is provided for a vehicle, and outputs a measured value of the steering angle of a steering wheel which changes the direction of the front wheels of the vehicle.

As illustrated in FIG. 1, the locus estimation device 1 includes a processing unit 3 and a storage unit 5. The processing unit 3 has the functions of a wheel speed acceptance unit 11, a steering angle acceptance unit 13, and a locus estimation unit 15. The storage unit 5 stores a parameter database (DB) 19.

Each of the above-mentioned functions of the processing unit 3 is realized by, for example, the CPU 21 reading and executing a control program. The wheel speed acceptance unit 11 accepts the measured values of the left wheel speed and the right wheel speed from the wheel speed sensor 33. The steering angle acceptance unit 13 accepts the measured value of the steering angle from the steering angle sensor 35.

The locus estimation unit 15 estimates the locus of the vehicle on the basis of the measured values of the left wheel speed, the right wheel speed, and the steering angle. In this case, the locus estimation unit 15 makes an estimation using a parameter stored in the parameter DB 19.

FIG. 3 is an example of a parameter table 110. The parameter table 110 includes a right-left wheel distance value T indicating a half of the distance between right and left wheels, a front-rear wheel distance L (hereafter referred to as a wheel base L), and a constant μ. The right-left wheel distance value T is a half of the distance between the front wheels of the vehicle. For example, it is a real number representing meters (m), for instance. The wheel base L refers to the distance between the front wheels and the rear wheels in the direction of the body of the vehicle. For example, it is a real number representing meters (m), for instance. The constant μ is predetermined by a set value of a vehicle. For example, it is a real number representing radians. The constant μ may be obtained, for example, from the relationship between the turning angle of the steering wheel and the rotation radius of the vehicle at the turning angle. Alternatively, it may be obtained from a set value of a steering mechanism model described later.

Figure 4:
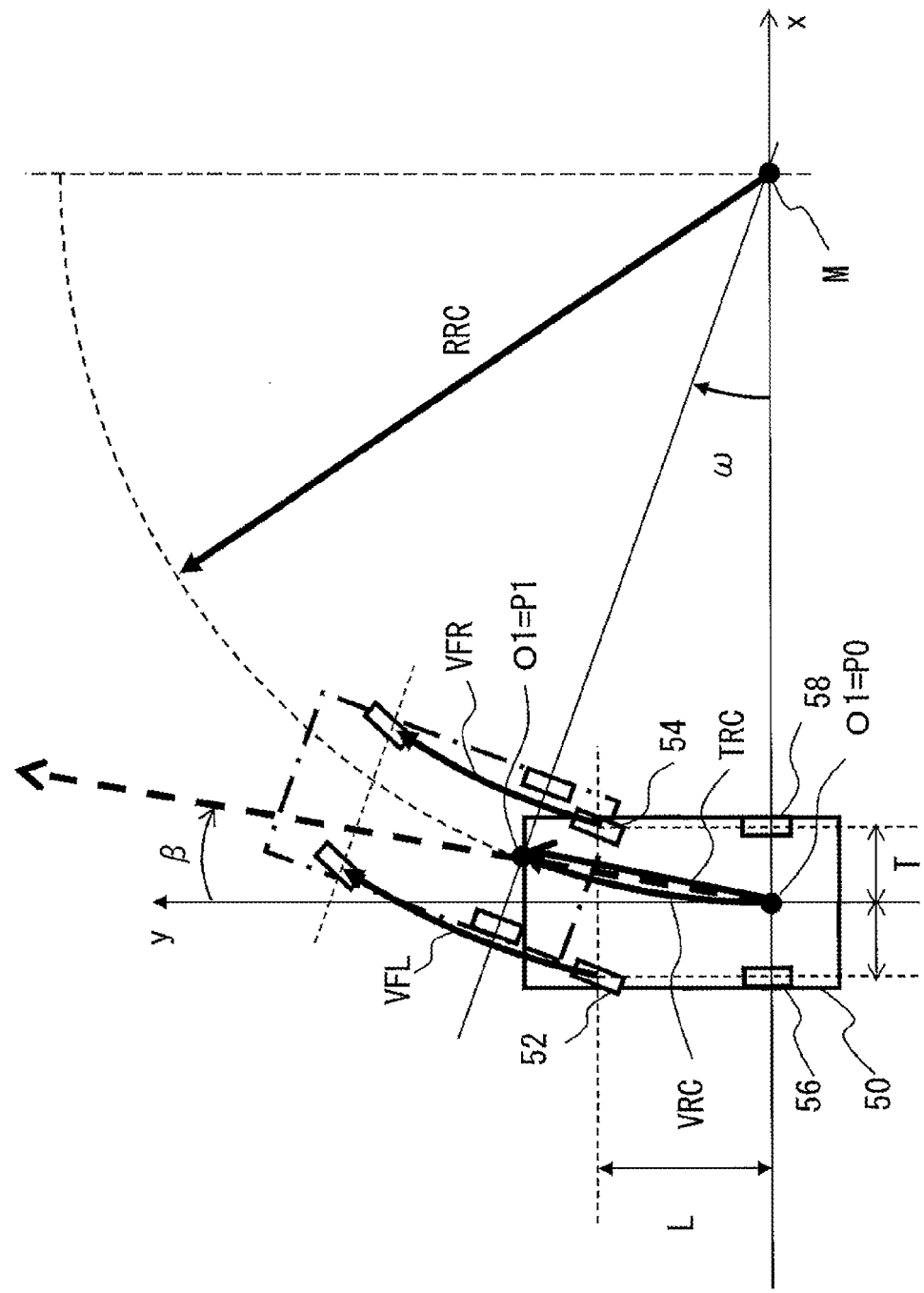
FIG. 4 is an explanatory illustration of a circular movement of a geometric model according to the first embodiment of the present invention.

A geometric model of estimating a locus which is used in the locus estimation device 1 is described below with reference to FIGS. 4 through 8. FIG. 4 is an explanatory illustration of a circular movement of a geometric model. As illustrated in FIG. 4, the locus estimation device 1 estimates the locus of movement of a vehicle 50 as a circular movement with respect to a rotation center M. The vehicle 50 includes a left front wheel 52, a right front wheel 54, a left rear wheel 56, and a right rear wheel 58. In FIG. 4, the x axis and the y axis are orthogonal to each other. The x axis may pass through the rotation center of the left rear wheel 56 and the rotation center of the right rear wheel 58. The y axis may pass through a middle point O1 between the rotation center of the left rear wheel 56 and the rotation center of the right rear wheel 58, and may be parallel to the direction of the body of the vehicle 50. The intersection of the x axis and the y axis is referred to as an origin P0.

The axis which connects the rotation center of the left rear wheel 56 to the rotation center of the right rear wheel 58 is referred to as a rear wheel axle. The distance between the front wheels and the rear wheels of the vehicle 50 in the direction of the body of the vehicle is the wheel base L. The right-left wheel distance value T is a half of the distance between the left front wheel 52 and the right front wheel 54. With the geometric model, the estimation of the locus of the vehicle 50 is made as the locus of the middle point O1. Therefore, the middle point O1 is hereafter referred to as an estimated point O1.

In the example illustrated in FIG. 4, the estimated point O1 of the vehicle 50 indicates the state of the rotation movement from the intersection of the x and y axes (origin P0) to a position P1 where a rotation angle ω is obtained with respect to the rotation center M. Rotation radius RRC is a radius of the circular movement of the estimated point O1. A state in which the estimated point O1 is on the origin P0 of the xy coordinate system in FIG. 4 is referred to as pre-movement, and a state in which it is in the position P1 is referred to as post-movement. Left front wheel speed VFL is expressed as, for example, a movement locus of the left front wheel 52 from the pre-movement to post-movement state in unit time. Right front wheel speed VFR is expressed as, for example, a movement locus of the right front wheel 54 from the pre-movement to post-movement state in unit time. Vehicle speed VRC is expressed as a movement locus of the estimated point O1 from the pre-movement to post-movement state. Translation amount TRC is an amount of translation of the estimated point O1 from the pre-movement to post-movement state. A traveling angle β is made by the direction of the translation amount TRC and the y axis. It is assumed that the angle made by the left front wheel 52 and the right front wheel 54 and the direction of the body of the vehicle is constant.

<Estimation of vehicle speed VRC at estimated point O1>

In FIG. 4, the left front wheel speed VFL and the right front wheel speed VFR are expressed by equation 1 from the geometric relation.

$$VFL = RFL \times \omega = \sqrt{((RRC+T)^2 + L^2)} \times \omega$$

$$VFR = RFR \times \omega = \sqrt{((RRC-T)^2 + L^2)} \times \omega \qquad \text{(equation 1)}$$

Here, sqrt (F) indicates the square root of F. In this case, when the root mean square value of each wheel speed of the left front wheel 52 and the right front wheel 54 is root mean square wheel speed VRMS, it is expressed by following equation 2.

$$VRMS = \sqrt{((VFL^2 + VFR^2)/2)} = \qquad \text{(equation 2)}$$
$$\sqrt{((((RRC+T)^2 + L^2) \times \omega^2 +$$
$$(((RRC-T)^2 + L^2) \times \omega^2)/2)} =$$
$$\omega \times \sqrt{(RRC^2 + L^2 + T^2)}$$

When equation 2 is solved for the rotation angle ω, following equation 3 is obtained.

$$\omega = VRMS/\sqrt{(RRC^2 + L^2 + T^2)} \qquad \text{(equation 3)}$$

Since the root mean square wheel speed VRMS is constantly represented by a positive value, the parameter k of following equation 4 is introduced as a parameter indicating a sign.

$$k = 1 : ((VFL+VFR)/2 \geq 0)$$

$$k = -1 : ((VFL+VFR)/2 < 0) \qquad \text{(equation 4)}$$

The rotation angle ω is redefined by following equation 5 using equations 3 and 4 above.

$$\omega = k \times VRMS/\sqrt{(RRC^2 + L^2 + T^2)} \qquad \text{(equation 5)}$$

Therefore, the vehicle speed VRC at the estimated point O1 located at the center of the rear wheel axle is represented by following equation 6.

$$VRC = \qquad \text{(equation 6)}$$
$$RRC \times \omega = RRC \times k \times VRMS/\sqrt{(RRC^2 + L^2 + T^2)}$$

Generally, since it is hard to perform a calculation for a description with the rotation radius RRC which refers to an infinite rotation radius in straight travel, a curvature c as a reciprocal of the rotation radius is introduced. The value c is defined by following equation 7.

$$c = 1/RRC \quad (RRC = 1/c) \qquad \text{(equation 7)}$$

Following equation 8 is obtained by means of equations 6 and 7.

$$VRC = (1/c) \times k \times VRMS/\sqrt{((1/c)^2 + L^2 + T^2)} = \qquad \text{(equation 8)}$$
$$k \times VRMS/\sqrt{((L^2 + T^2) \times c^2 + 1)} = k \times \sqrt{}$$
$$((VFL^2 + VFR^2)/(2 \times ((L^2 + T^2) \times c^2 + 1)))$$

By means of equation 8 above, a geometrically right vehicle speed VRC at the estimated point O1 is estimated from the left front wheel speed VFL and the right front wheel speed VFR.

<Estimation of front wheel direction angle γ, rotation radius RRC, and curvature c> Next, the relationship between the front wheel direction angle γ and the curvature c is explained with reference to FIGS. 5 and 6. FIG. 5 is an example of a steering mechanism model. FIG. 6 illustrates the relationship between the front wheel direction angle γ and the curvature c.

As illustrated in FIG. 5, with the steering mechanism model according to the present embodiment, a model is generated as a parallel linkage as a first approximation. The front wheel direction angle γ refers to an angle made between the direction of the body of the vehicle 50 and the left front wheel 52 or the right front wheel 54.

As illustrated in FIG. 5, a model of a steering mechanism of an actual vehicle is generated as a parallel linkage as a first approximation. With an actual vehicle, for example, a pinion gear is operated by a steering axis extended from the steering wheel, and received by a rack gear to displace a tie rod to the left or right. It is assumed that the tie rod is connected to a vehicle hub through a knuckle arm. In the steering mechanism model according to the present embodiment, knuckle arms 66 and 68, and a rack (tie rod 64) are approximated as a parallel link where they are located at 90 degrees.

In FIG. 5, with the present steering mechanism model, it is assumed that the left front wheel 52 and the right front wheel 54 are parallel to each other, and the wheels make the same angle with the direction of the body of the vehicle. A steering axis 60 is extended from the steering wheel, not illustrated in the attached drawings, and rotates by, for example, a steering angle φ depending on the operation of the steering wheel. A pinion gear 62 converts rotation of the steering axis 60 into a straight line displacement by means of a rack and pinion mechanism. One end of the knuckle arm 66 is connected to the left front wheel 52, and the other end is connected to the tie rod 64 at a right angle. One end of the knuckle arm 68 is connected to the right front wheel 54, and the other end is connected to the tie rod 64 at a right angle. The length of the knuckle arms 66 and 68 is equal to knuckle arm length A.

Displacement amount U indicates right and left displacement with respect to the tie rod 64, and indicates the amount of displacement caused by conversion by the pinion gear 62 when the steering axis 60 rotates by the steering angle φ through operation of the steering wheel. The front wheel direction angle γ indicates the angle of the left front wheel 52 and the right front wheel 54 which changes through the knuckle arms 66 and 68 when the displacement of the tie rod 64 is the displacement amount U.

Following equation 9 holds true through the geometric relationship in the steering mechanism model illustrated in FIG. 5.

$$\tan(\gamma)=U/\mathrm{sqrt}(A^2-U^2) \quad \text{(equation 9)}$$

The displacement amount U is proportional to the steering angle φ, and is expressed by equation 10 with factor of proportionality p.

$$U=p\times\phi \quad \text{(equation 10)}$$

Following equation 11 holds true through the geometric relationship between the front wheel direction angle γ and the rotation radius RRC.

$$RRC=L/\tan(\gamma) \quad \text{(equation 11)}$$

Equation 12 holds true when the curvature c is introduced as described above.

$$c = 1/RRC = \tan(\gamma)/L = U/(L\times\mathrm{sqrt}(A^2 - U^2)) = \quad \text{(equation 12)}$$
$$(p\times\phi)/(L\times\mathrm{sqrt}(A^2 - (P\times\phi)^2)) =$$
$$\phi/(L\times\mathrm{sqrt}(\mu^2 - \phi^2))$$

The constant μ is expressed by following equation 13.

$$\mu=A/p \quad \text{(equation 13)}$$

FIG. 6 illustrates the relationship between the steering angle φ and the curvature c in the steering mechanism model illustrated in FIG. 5. That is, FIG. 6 illustrates the relationship of equation 12. As illustrated in FIG. 6, expression 12 indicates a relationship different from the case where there is a simple proportional relationship between the steering angle φ and the curvature c.

Figure 7:
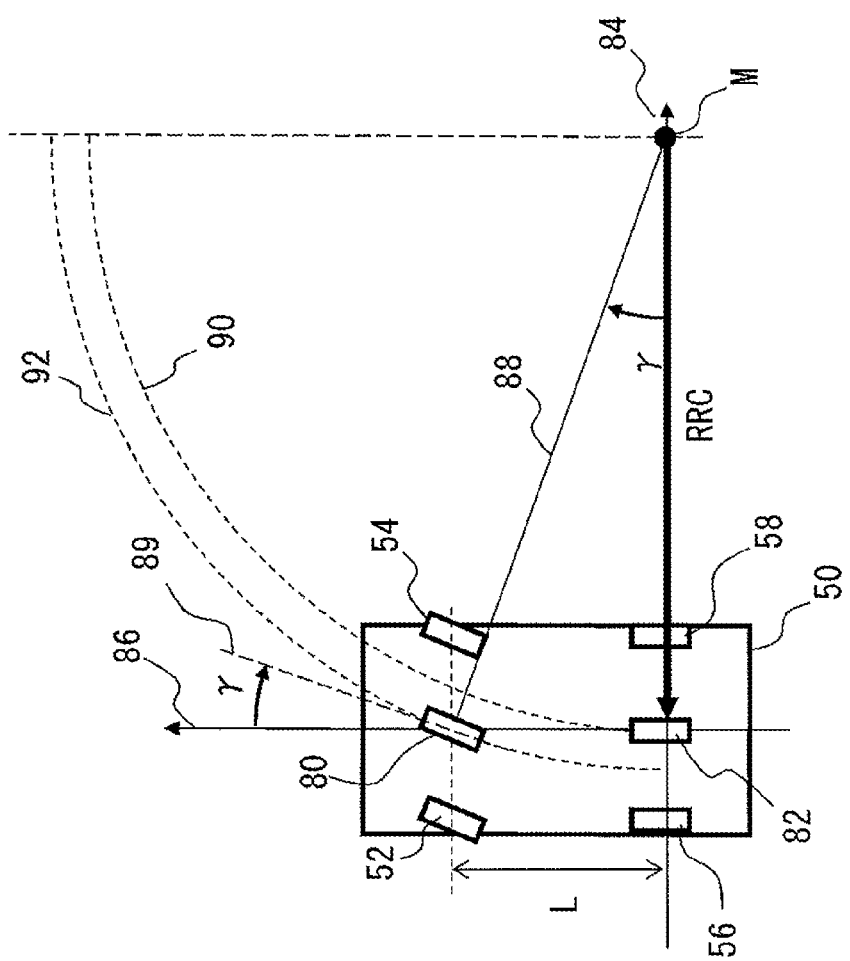
FIG. 7 illustrates the relationship between the front wheel direction angle and a rotation radius according to the first embodiment of the present invention.

FIG. 7 illustrates the relationship between the front wheel direction angle γ and the rotation radius RRC. For convenience of explanation below, FIG. 7 illustrates front wheel 80 and rear wheel 82. The front wheel 80 is located at the middle point between the left front wheel 52 and the right front wheel 54. The rear wheel 82 is located at the estimated point O1. A direction 89 indicates the traveling direction of the vehicle 50. The direction 89 makes an angle of the front wheel direction angle γ with an axis 86 indicating the direction of the body of the vehicle 50.

In this case, a rear wheel locus 90 is a locus of the rotation movement of the rear wheel 82 when the vehicle 50 performs a circular movement with respect to the rotation center M. Likewise, a front wheel locus 92 is a locus of the front wheel 80. Thus, the front wheel 80 and the rear wheel 82 make circular movements of different radii. Therefore, equation 12 is not to be applied to the case where the locus of the middle point of front wheels is indicated. That is, the curvature c expressed by equation 12 above indicates the locus of the estimated point O1 which is expressed using the wheel speed of the left front wheel 52 and the right front wheel 54. Thus, equation 12 above indicates a relationship between the steering angle φ and the curvature c which is less geometrically inconsistent and is higher in accuracy.

Figure 8:
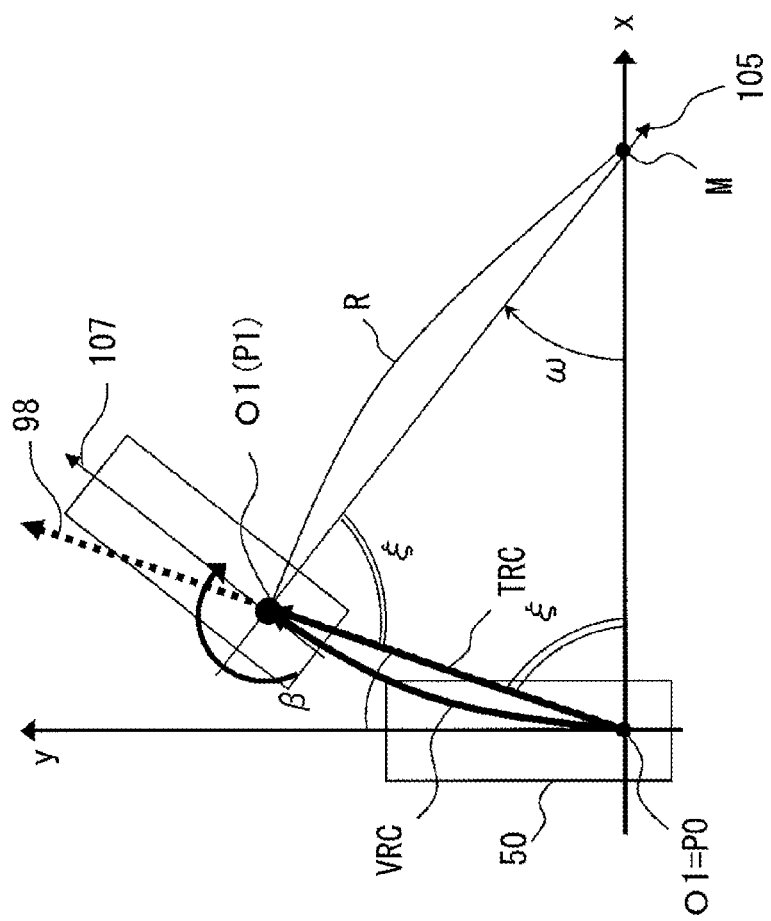
FIG. 8 illustrates the relationship between a traveling direction and an amount of rotation of a vehicle according to the first embodiment of the present invention.

<Formulation of moving direction with a rotation model in low speed movement> Next, the relationship between the moving direction and the amount of rotation of the vehicle 50 is explained with reference to FIG. 8. FIG. 8 is an explanatory illustration of the relationship between the moving direction and the amount of rotation of the vehicle 50. In FIG. 8, the estimated point O1 moves from the origin P0 (movement start point t1) of the coordinate system expressed by the x and y axes to the position P1 (time t2 after movement). In this case, the rotation center M is located on the x axis. The rotation angle of the vehicle 50 before and after a movement is expressed by the rotation angle ω. Axes 105 and 107 indicate an orthogonal coordinate system having the position P1 after movement as an origin. Assume that the driving speed of the vehicle 50 is sufficiently low. Therefore, there is no slipping with the driven wheels and the steered wheels, the wheels are driven by rotation, and their movements approximate circular movements. In this case, circular movements of the vehicle 50 are expressed as movement of the position of the estimated point O1.

When the estimated point O1 is located at the origin P0 as the start point of a circular movement of the vehicle 50, the following equation holds true through the geometric relationship illustrated in FIG. 8.

$$\text{distance}(P0 \text{ through } M) = \text{distance}(P1 \text{ through } M) \quad \text{(equation 14)}$$

That is, the triangle P0-P1-M is an equilateral triangle having the rotation amount ω of a moving object as a vertex. Therefore, the expression of angle P0-P1-M=angle P1-P0-M=ξ is obtained, and the following equation holds true.

$$\xi = (180° - \omega)/2 = 90° - \omega/2 \quad \text{(equation 15)}$$

According to equation 15, the traveling angle β as an angle made by the traveling direction of the vehicle 50 and the y axis is expressed by following equation 16.

(equation 16)

$$\beta = 90° - \xi = 90° - (90° - \omega/2) = \omega/2 \quad \text{(equation 16)}$$

That is, when the rotation amount ω of a moving object is known, the traveling direction β of the moving object at time t1 is determined by the physical restriction of the moving object. The arc which connects the origin P0 and the origin P1 is a movement locus at time t1 through t2, and the traveling distance may be the vehicle speed VRC of the estimated point O1. If the chord from the origin P0 to the origin P1 is the translation amount TRC, the translation amount TRC is a translation component of the estimated point O1. From the geometric relationship in FIG. 8, following equation 17 holds true.

$$TRC = (2 \times VRC \times \sin(\omega/2))/\omega \quad \text{(equation 17)}$$

Therefore, a geometrically right amount of translation may be estimated as follows. Assuming that the x component of the amount of translation is a movement amount tx, and the y component is a movement amount ty, following equation 18 is obtained.

$$tx = TRC \times \sin(\beta) = TRC \times \sin(\omega/2)$$

$$ty = TRC \times \cos(\beta) = TRC \times \cos(\omega/2) \quad \text{(equation 18)}$$

The locus estimating process of the locus estimation device 1 is described below with reference to FIG. 9. FIG. 9 is a flowchart of an example of operation of the locus estimation device 1. In the locus estimation device 1, the wheel speed acceptance unit 11 accepts a measured value of the wheel speed of each of the right and left front wheels. The steering angle acceptance unit 13 accepts a measured value of the steering angle of the front wheels (S121). The locus estimation unit 15 estimates the locus of a moving object by means of equations 1 through 18 above using the measured value of the wheel speed of each of the right and left front wheels and the measured value of the steering angle of the front wheels. In this case, the locus estimation device 1 estimates the locus on the basis of the wheel speed of the right and left front wheels, the steering angle, the distance between the front and rear wheels in the direction of the body of the vehicle, and a constant depending on the steering angle and the rotation radius of the moving object at the steering angle (S122).

Thus, the locus estimation device 1 estimates the movement of the middle point of the rotation center of the right and left rear wheels as a circular movement. The circular movement has a point on the straight line which passes through the rotation center of the two rear wheels as the center. The locus is estimated as the amount of rotation and the amount of translation of the moving object. The locus estimation device 1 repeats the processes in S121 and S122 until a pause of the system is detected (NO in S123), and terminates the processes when a pause is detected (YES in S123).

As described above, according to the locus estimation device 1 of the present embodiment, with regard to movement for a short time which may be described by a circular movement, the locus of the vehicle 50 may be estimated with high accuracy using the rotation amount ω and the amount of translation (tx, ty).

In this case, the locus estimation device 1 uses measured values of the wheel speed of the front wheels and the steering angle. The locus estimation device 1 also uses predetermined right-left wheel distance value T, wheel base L, and constant μ. Thus, when the vehicle 50 is assumed to perform a circular movement, the locus may be estimated with high accuracy as the movement of the estimated point O1 which is the middle point of the rear wheel axle. In this case, the direction of translation of the vehicle 50 is estimated as a direction different from the direction of the vehicle 50. For example, the rotation amount ω, the translation amount TRC, and the amount of translation (tx, ty) are calculated by means of equations 5, 8, 12, 17, and 18.

The proportion between the steering angle and the measured value of the rotation radius of a vehicle is not always determined, but a value close to the measured value may be used with the relationship between the steering angle and the rotation radius of a vehicle, and the accuracy of locus estimation may be further improved.

For a moving object having front wheels as steered wheels and a total of four front and rear wheels, the above-mentioned locus estimation device 1 may estimate a movement locus at a low speed according to the amount of rotation and the amount of translation using as input the wheel speed of the right and left front wheels and the steering angle. The locus estimation device may be used in, for example, automatic drive when parking or starting a vehicle, generation of a contact alarm regarding surrounding objects by measuring their positions on the basis of movement stereo using an onboard camera image, etc.

(Second embodiment) A locus estimation device 150 according to a second embodiment is described below. In the second embodiment, configuration elements and operations identical to those in the locus estimation device 1 are assigned the same reference numerals to avoid duplicate explanation. An example of the hardware configuration of the locus estimation device 150 is the same as the example of the locus estimation device 1.

Figure 10:
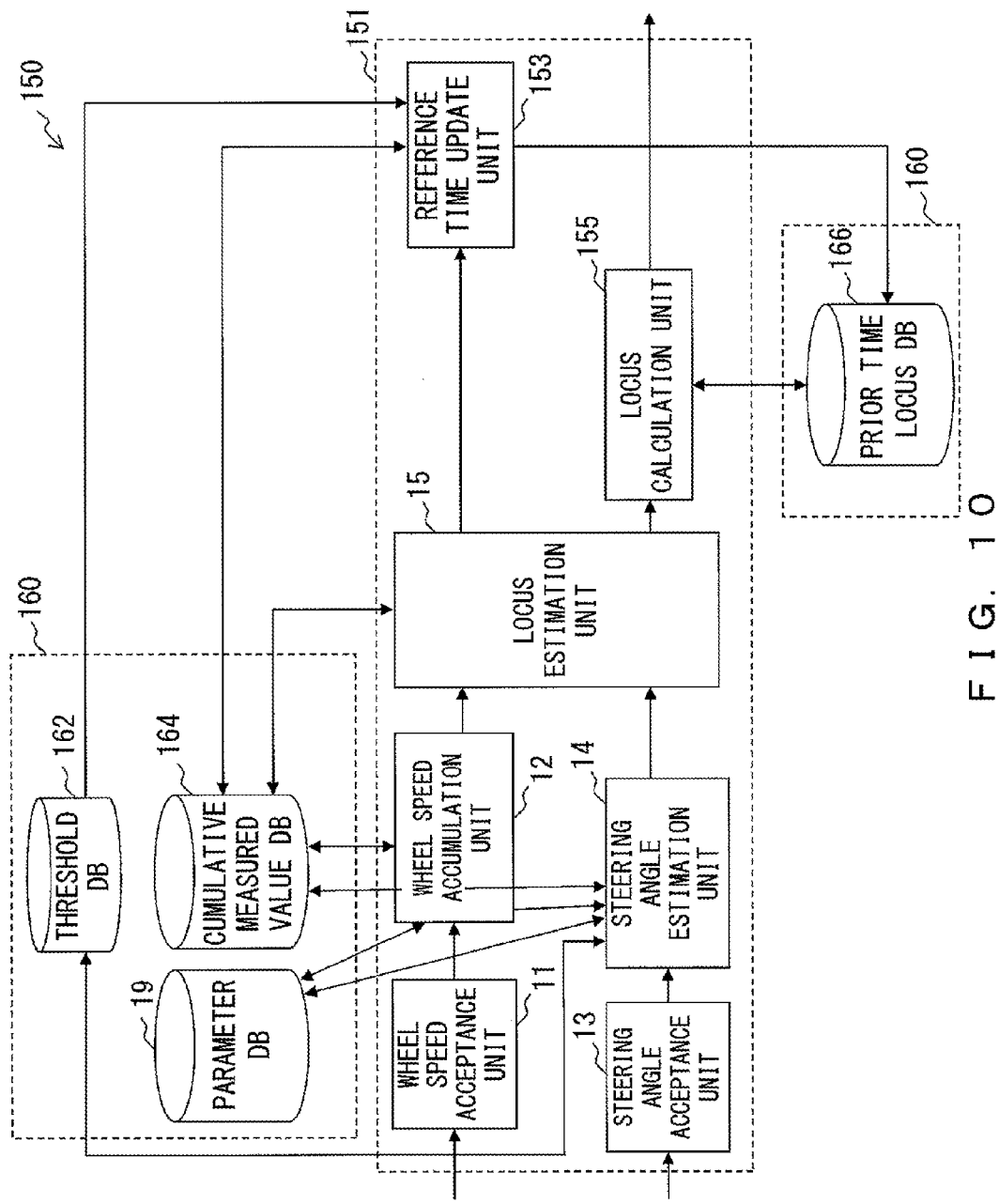
FIG. 10 is a block diagram of an example of a functional configuration of the locus estimation device according to the second embodiment of the present invention.

FIG. 10 is a block diagram of an example of a functional configuration of the locus estimation device 150 according to the second embodiment of the present invention. The locus estimation device 150 accepts measured values of the wheel speed and the steering angle which have been measured at each specified measuring time. The locus estimation device 150 sets a reference time from among the measuring times, estimates the locus of the vehicle 50 from the set reference time to the latest measuring time, and estimates the locus from the measuring time immediately before to the latest measuring time on the basis of the estimated locus. Furthermore, the locus estimation device 150 updates the reference time on the basis of the locus of the vehicle 50 from the reference time to the latest measuring time. The reference time refers to the starting time when the starting time and the average steering angle are calculated to accumulate the wheel speed, and corresponds to the position before movement when a locus is estimated. The latest measuring time refers to the time when the measured value last input from the wheel speed acceptance unit 11 or the steering angle acceptance unit 13 is measured, and may be, for convenience, the time when input is last accepted. The time may be not only an absolute time but also a relative time which is appropriately defined.

As illustrated in FIG. 10, the locus estimation device 150 according to the second embodiment includes an processing unit 151 and a storage unit 160. The processing unit 151 includes the wheel speed acceptance unit 11, a wheel speed accumulation unit 12, the steering angle acceptance unit 13, a steering angle estimation unit 14, the locus estimation unit 15, a reference time update unit 153, and a locus calculation unit 155. The storage unit 160 includes the parameter DB 19, a threshold DB 162, a cumulative measured value DB 164, and a prior time locus DB 166.

The wheel speed accumulation unit 12 accumulates from the reference time for each specified time each wheel speed of the left front wheel 52 and the right front wheel 54 accepted by the wheel speed acceptance unit 11, and stores a result in the cumulative measured value DB 164. The steering angle estimation unit 14 accumulates from the reference time the steering angle accepted by the steering angle acceptance unit 13, and stores the calculated cumulative steering angle and the accumulation frequency in the cumulative measured value DB 164.

In this case, the wheel speed acceptance unit 11 accepts the wheel speed of each of the right and left wheels measured at each specified time. The wheel speed accumulation unit 12 reads the wheel speed cumulative values of the right and left wheels up to the prior measuring time stored in the cumulative measured value DB 164, adds the wheel speed last input from the wheel speed acceptance unit 11, and writes back the totaled value to the cumulative measured value DB 164. Furthermore, the wheel speed accumulation unit 12 outputs the cumulative value of the wheel speed to the locus estimation unit 15. In addition, the wheel speed accumulation unit 12 judges whether or not the vehicle 50 has stopped from the level of the wheel speed at the latest measuring time, and outputs the existence of a movement to the steering angle estimation unit 14.

The steering angle acceptance unit 13 accepts the measured value of the steering angle measured at each specified time. When it is judged that the vehicle 50 has not stopped, the steering angle estimation unit 14 reads the steering angle cumulative value up to the prior measuring time stored in the cumulative measured value DB 164, and adds the steering angle last input from the steering angle acceptance unit 13. When it is judged that the vehicle 50 has not stopped, the steering angle estimation unit 14 reads the accumulation frequency from the cumulative measured value DB 164 and adds 1 to the read value, and writes back the steering angle cumulative value and the accumulation frequency to the cumulative measured value DB 164.

The locus estimation unit 15 estimates the locus of the vehicle 50 on the basis of the cumulative value of the wheel speed stored in the cumulative measured value DB 164 and the average steering angle depending on the cumulative steering angle and the accumulation frequency. The process of the locus estimation unit 15 is performed using the cumulative value of wheel speed and the average value of the steering angle instead of the wheel speed and the steering angle with the locus estimation device 1 according to the first embodiment of the present invention.

On the basis of the estimation result of the locus estimation unit 15, the reference time update unit 153 updates the reference time when it is judged that the reference time is to be updated. Details of the judgment on the update of the reference time are described later.

The locus calculation unit 155 calculates the locus of the vehicle 50 on the basis of the locus estimated by the locus estimation unit 15 and the locus stored in the prior time locus DB 166. The calculated rotation amount $\omega$ and the amount of translation are stored in the prior time locus DB 166.

The threshold DB 162 is a database which stores thresholds for use in the process of the locus estimation unit 15, the process of the reference time update unit 153, and the process of the locus calculation unit 155. FIG. 11 is an example of a threshold table 182. The threshold table 182 is an example of the data structure of the threshold DB 162. As illustrated in FIG. 11, the threshold table 182 includes a movement judgment threshold TH1, a movement frequency threshold TH2, a rotation judgment threshold TH$\omega$, and a reference time update threshold THK.

The movement judgment threshold TH1 is a threshold for the wheel speed for judgment of existence of movement, and is, for example, a real number representing kilometers per hour. The movement frequency threshold TH2 is a threshold for hysteresis to prevent chattering of a stop flag STOP_F described later, and is an integer value corresponding to a frequency judged as a stop. The rotation judgment threshold TH$\omega$ is a threshold for judgment of an existence of a rotation, and is, for example, a real number representing degrees. The reference time update threshold THK is a threshold for judgment as to whether or not a reference time is to be updated, and is, for example, a real number representing centimeters.

FIG. 12 is an example of a cumulative measured value table 184. The cumulative measured value table 184 is an example of a data structure of the cumulative measured value DB 164. As illustrated in FIG. 12, the cumulative measured value table 184 includes a cumulative left wheel speed CUMVL, a cumulative right wheel speed CUMVR, a stop counter SCOUNT, a stop flag STOP_F, a cumulative steering angle amount CUM$\phi$, and an accumulation frequency N$\phi$. The cumulative left wheel speed CUMVL is obtained by accumulating the left wheel speed measured at each specified time from the reference time, and is, for example, a real number representing meters per second. The cumulative right wheel speed CUMVR is obtained by accumulating the right wheel speed measured at each specified time from the reference time, and is, for example, a real number representing meters per second. The stop counter SCOUNT is a count value used in judging movement, and is an integer value. The stop flag STOP_F is a discriminant value used in judging a stop, and is, for example, set to "1" when a stop is confirmed, and to "0" when no stopping is confirmed. The cumulative steering angle amount CUM$\phi$ is obtained by accumulating the steering angle $\phi$ measured at each specified time, and is, for example, a real number representing degrees. The accumulation frequency N$\phi$ is an accumulation frequency of the steering angle $\phi$, and is an integer value.

FIG. 13 is an example of the prior time locus table 186. The prior time locus table 186 is an example of a data structure of the prior time locus DB 166. As illustrated in FIG. 13, the prior time locus table 186 includes a prior time rotation amount $\alpha p$ from the reference time to the measuring time immediately before the latest measuring time, a prior time x translation amount qxp, and a prior time y translation amount qyp. The prior time rotation amount $\alpha p$ is, for example, a real number representing degrees. The prior time x translation amount qxp and the prior time y translation amount qyp are, for example, real numbers representing meters.

FIG. 14 is an explanatory illustration of the influence of accumulated error. FIG. 14 illustrates the vehicle 50 moving on a road surface 170. Locus 172 indicates actual movement of the vehicle 50. An estimated locus 174 continuously indicates the locus at each specified time estimated by the locus estimation device 150 as a result of updating the reference time at each measuring time. In the example illustrated in FIG. 14, the error between the locus 172 and the estimated locus 174 increases each time a measurement is performed, and reaches, for example, an error 176. It is considered that the error is caused by measuring the wheel speed, the steering angle, etc. as digital values at each specified time, and approximating the locus of the vehicle 50. Thus, to eliminate error caused by accumulation, a reference time is set in the present embodiment to estimate the locus to some distance from the reference time.

Figure 15:
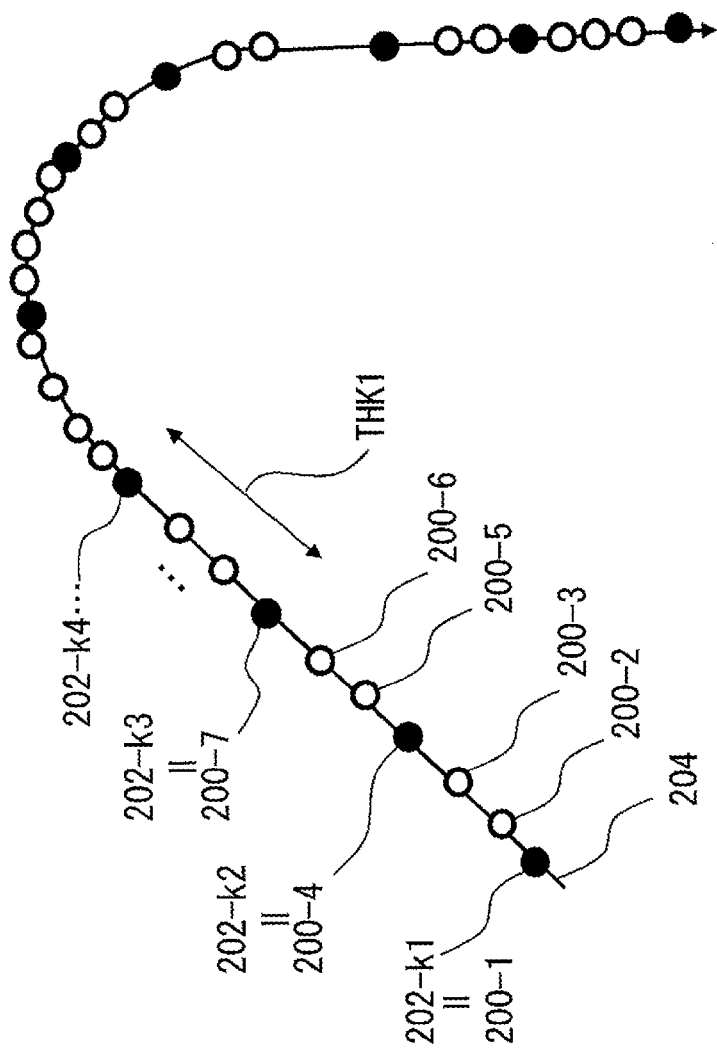
FIG. 15 is an explanatory illustration of a locus estimating method according to the second embodiment of the present invention.
Figure 16:
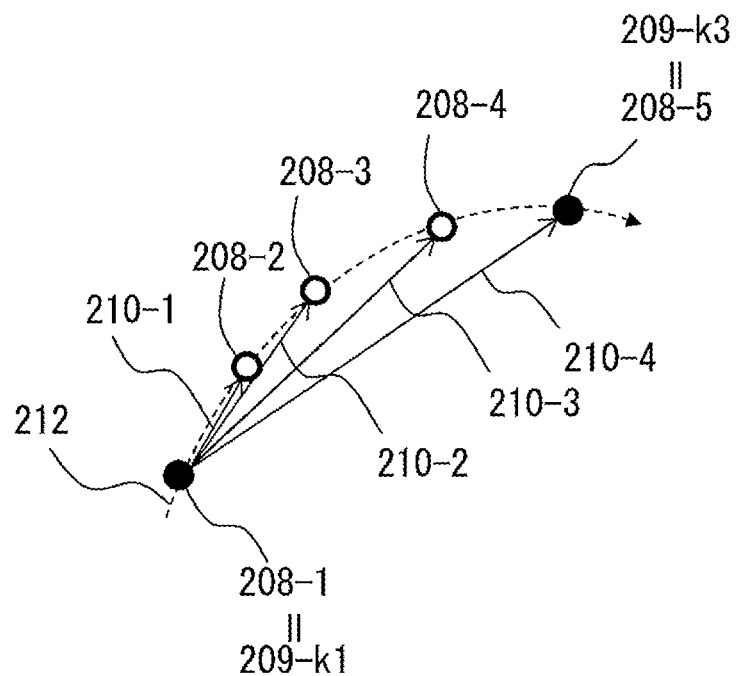
FIG. 16 is an explanatory illustration of a locus estimating method according to the second embodiment of the present invention.

FIGS. 15 and 16 are explanatory illustrations of a locus estimating method according to the present embodiment. As illustrated in FIG. 15, measuring time estimated positions 200-1, 200-2, . . . (which may be collectively referred to as measuring time estimated positions 200) indicate the estimated positions of the vehicle 50 at each specified wheel speed measuring time. A locus 204 is a curve which connects the measuring time estimated positions 200, and is an estimated movement locus of the vehicle 50. In this case, the reference time estimated positions 202-k1, 202-k2, . . . indicate the estimated positions of the vehicle 50 at the reference time. A reference time update threshold THK1 indicates a distance as a threshold for an update of the reference time. In the present embodiment, when the estimated translation distance from the reference time is more than the reference time update threshold THK1, the latest measuring time is defined as a new reference time. Furthermore, the estimated position at each measuring time is estimated on the basis of the cumulative wheel speed from the latest reference time to the latest measuring time, and the average steering angle. The method of calculating an estimated position output corresponding to each measuring time is described later.

As illustrated in FIG. 16, a measuring time estimated position 208-1 is a reference time estimated position 209-k1. That is, the reference time is a measuring time corresponding to the measuring time estimated position 208-1. Next, the locus estimation unit 15 estimates the locus between the measuring time estimated position 208-1 and the measuring time estimated position 208-2 of the vehicle 50 on the basis of the cumulative wheel speed from the reference time up to the measuring time corresponding to the measuring time estimated position 208-2 and the average steering angle. A translation amount 210-1 is an estimated amount of translation between the measuring time estimated position 208-1 and the measuring time estimated position 208-2. When the translation amount 210-1 is not more than the reference time update threshold THK1, the locus of the vehicle 50 is estimated at the next measuring time on the basis of the cumulative wheel speed and the average steering angle from the reference time, thereby obtaining a measuring time estimated position 208-3. In the example in FIG. 16, a translation amount 210-4 estimated at a measuring time estimated position 208-5 is more than reference time update threshold THK1. In this case, the measuring time corresponding to a reference time estimated position 209-k2 is an updated reference time.

Figure 17:
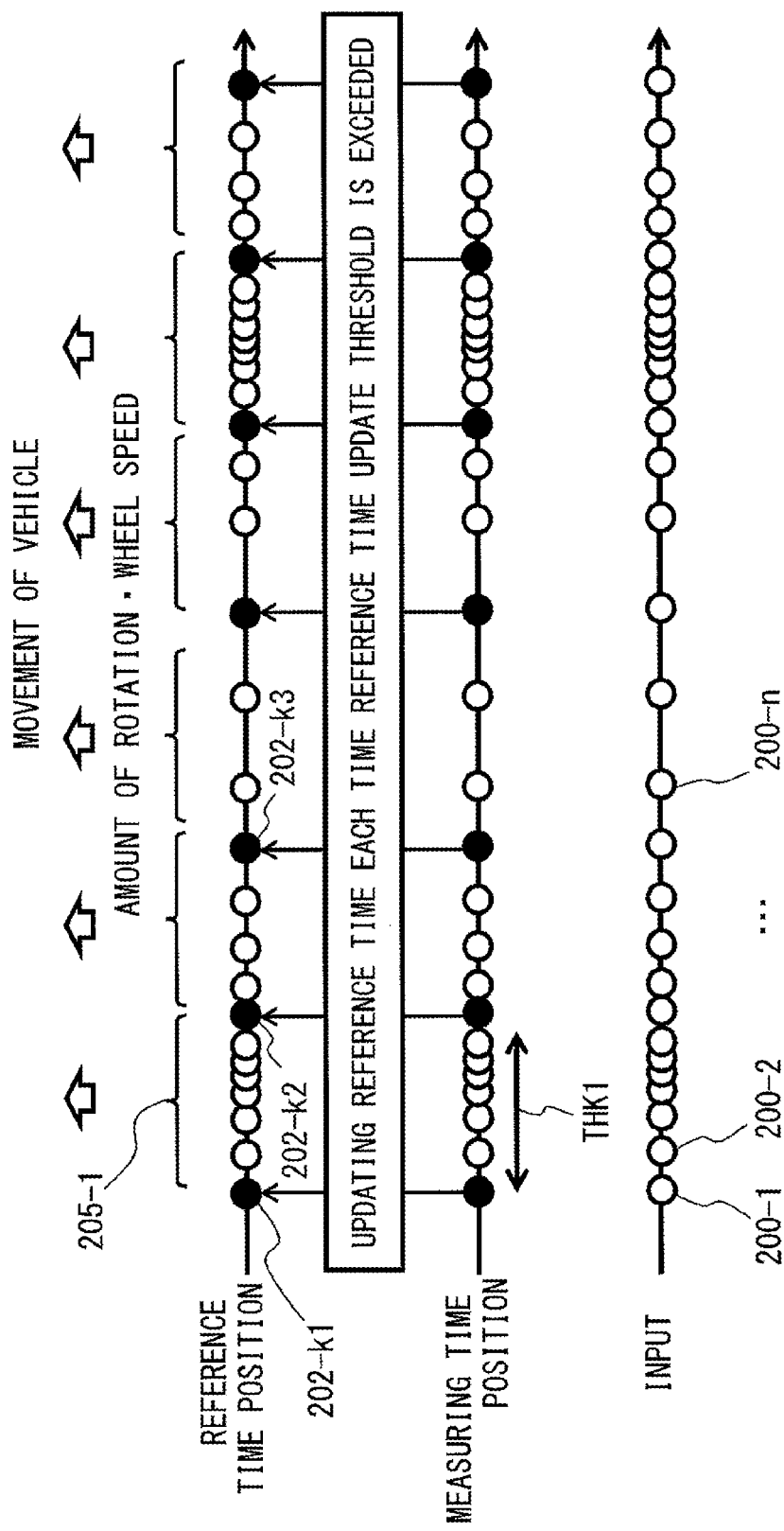
FIG. 17 is an explanatory illustration of reducing cumulative error by reference time selection according to the second embodiment of the present invention.

FIG. 17 is an explanatory illustration of reducing cumulative error by reference time selection according to the second embodiment of the present invention. As illustrated in FIG. 17, for example, input of the wheel speed and the steering angle is performed at times corresponding to the measuring time estimated positions 200-1, 200-2, . . . . The reference time is updated when the estimated amount of translation from the reference time immediately before is more than the reference time update threshold THK1. The estimation of a locus is performed on the basis of the measurement result of the wheel speed and the steering angle from the reference time to the measuring time. The output estimation result is calculated as a difference between the estimation result from the reference time to the prior measuring time and the estimation result from the reference time to the latest measuring time.

Figure 18:
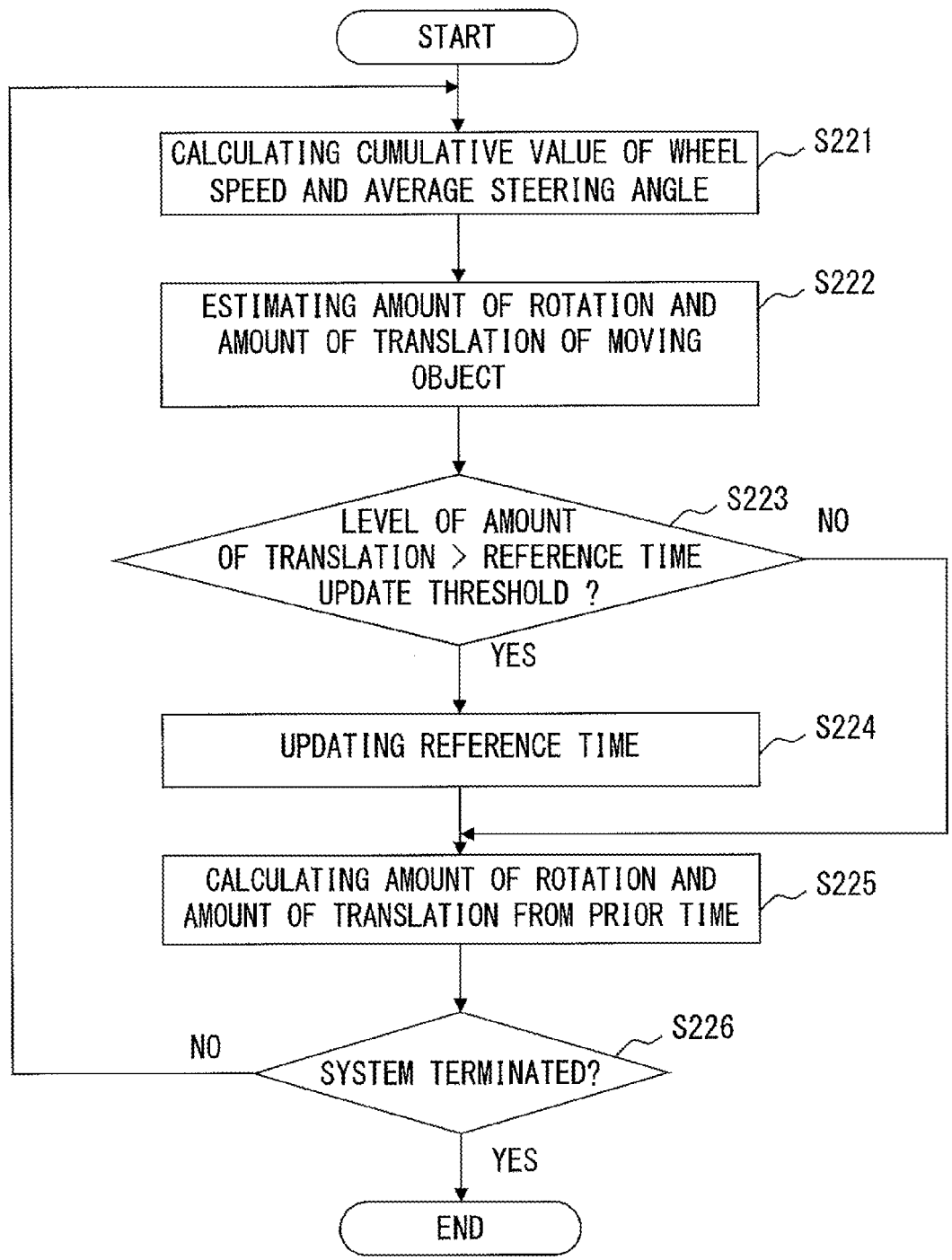
FIG. 18 is a flowchart of the main process of the locus estimation device according to the second embodiment of the present invention.

The operation of the locus estimation device 150 according to the second embodiment is explained with reference to FIGS. 18 through 21. FIG. 18 is a flowchart of the main process of the locus estimation device 150. As illustrated in FIG. 18, in the locus estimation device 150, the wheel speed accumulation unit 12 accumulates the measured value of the wheel speed accepted by the wheel speed acceptance unit 11, and stores the value in the cumulative measured value DB 164. When the wheel speed accumulation unit 12 judges that the vehicle 50 is moving, the steering angle estimation unit 14 accumulates the measured value of the steering angle accepted by the steering angle acceptance unit 13 and calculates the average steering angle, and stores the cumulative value in the cumulative measured value DB 164 (S221). Details of the process in S221 are described later.

The locus estimation unit 15 estimates the amount of rotation and the amount of translation as in the first embodiment on the basis of the cumulative wheel speed calculated by the wheel speed accumulation unit 12 and the average steering angle calculated by the steering angle estimation unit 14 (S222). Details of the process in S222 are described later.

The reference time update unit 153 updates the reference time (S224) when the estimated amount of translation is more than the reference time update threshold THK1 (YES in S223). When the estimated amount of translation is not more than the reference time update threshold THK1 (NO in S223), the reference time update unit 153 performs the process in S225.

The locus calculation unit 155 calculates the amount of rotation and the amount of translation from the prior time on the basis of the information stored in the prior time locus table 186, the estimated rotation angle ω, and the amount of translation dx and dy (S225). The processing unit 151 judges whether or not there has been an operation etc. for termination of the system. If there has not been such an operation (NO in S226), the processing unit 151 repeats the processes from S221. If there has been such an operation (YES in S226), the processing unit 151 terminates the locus estimating process.

Figure 19:
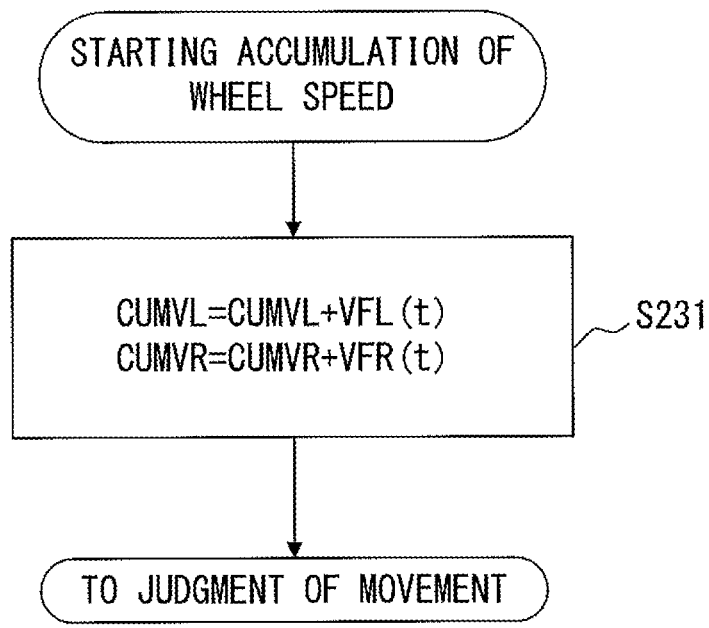
FIG. 19 is a flowchart of a wheel speed accumulating process of the locus estimation device according to the second embodiment of the present invention.

FIG. 19 is a flowchart of the wheel speed accumulating process of the locus estimation device 150. The process in FIG. 19 indicates the details of the process in S221. As illustrated in FIG. 19, the wheel speed accumulation unit 12 performs the following operation on the left front wheel speed VFL (t), the right front wheel speed VFR (t), the cumulative left wheel speed CUMVL, and the cumulative right wheel speed CUMVR at measuring time t accepted by the wheel speed acceptance unit 11 (S231).

$$CUMVL = CUMVL + VFL(t)$$

$$CUMVR = CUMVR + VFR(t) \quad \text{(equation 19)}$$

The wheel speed accumulation unit 12 updates the cumulative measured value table 184 by writing back to the cumulative measured value table 184 the calculated cumulative left wheel speed CUMVL and the cumulative right wheel speed CUMVR, and outputs it to the locus estimation unit 15. The wheel speed accumulation unit 12 passes control to the judgment of movement in FIG. 20.

Figure 20:
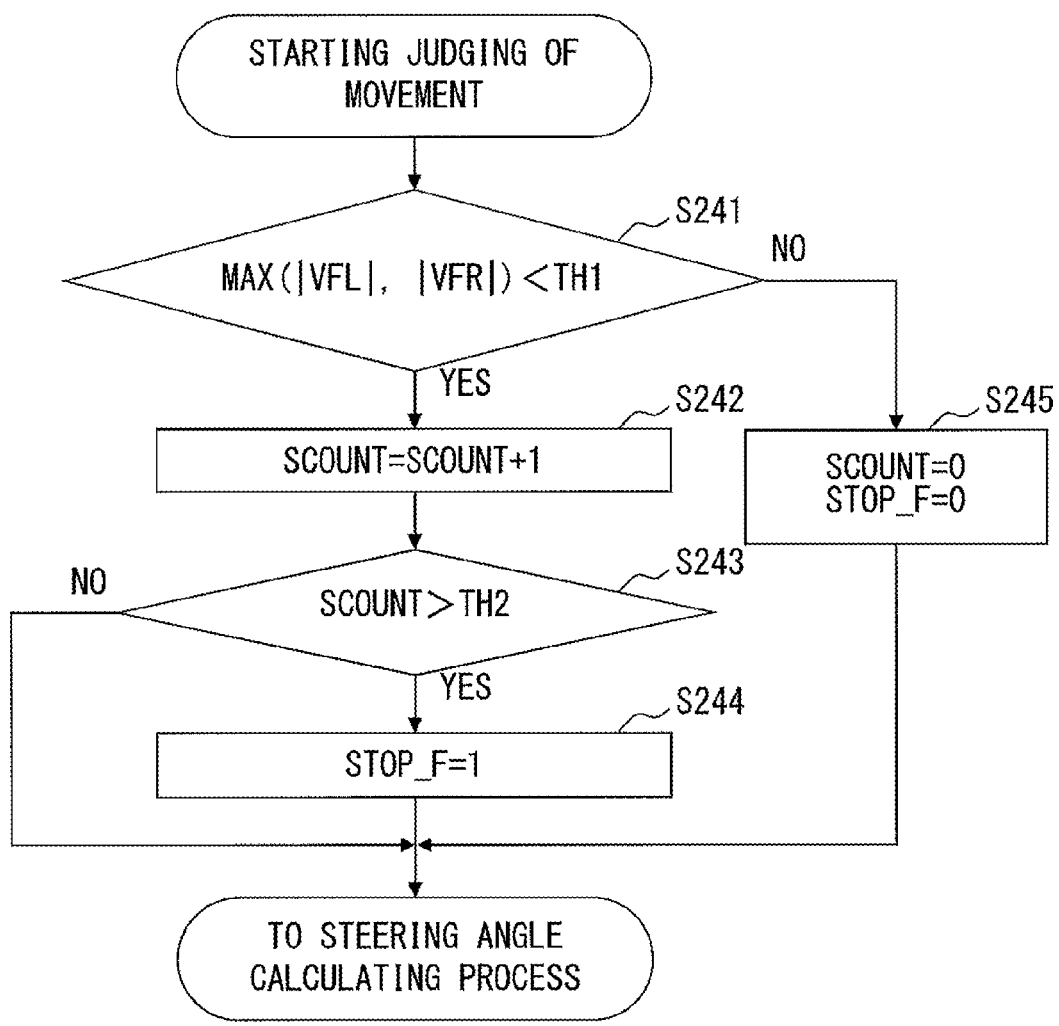
FIG. 20 is a flowchart of a movement judging process according to the second embodiment of the present invention.

FIG. 20 is a flowchart of the movement judging process. The wheel speed accumulation unit 12 sets the initial values of the stop counter SCOUNT and the stop flag STOP_F to "0". When the maximum value in the right and left wheel speeds VFL (t) and VFR (t) at the latest measuring time is smaller than the movement judgment threshold TH1 (YES in S241), the wheel speed accumulation unit 12 adds "1" to the stop counter SCOUNT, and updates the cumulative measured value table 184 (S242). When the stop counter SCOUNT is larger than the movement frequency threshold TH2 (YES in S243), the wheel speed accumulation unit 12 sets stop flag STOP_F=1 (S244), and passes control to the steering angle accumulating process. The wheel speed accumulation unit 12 passes control to the steering angle accumulating process when the stop counter SCOUNT is not more than the movement frequency threshold TH2 (NO in S243).

The wheel speed accumulation unit 12 passes control to the process in S245 when the maximum value in the right and left wheel speeds VFL (t) and the VFR (t) at the latest measuring time is not less than the movement judgment threshold TH1 (NO in S241). In S245, the wheel speed accumulation unit 12 sets stop counter SCOUNT=0 and stop flag STOP_F=0, updates the cumulative measured value table 184 (S245), and passes control to the steering angle accumulating process. Thus, in the movement judgment, the stop flag STOP_F is output as a judgment result to the cumulative measured value table 184.

Figure 21:
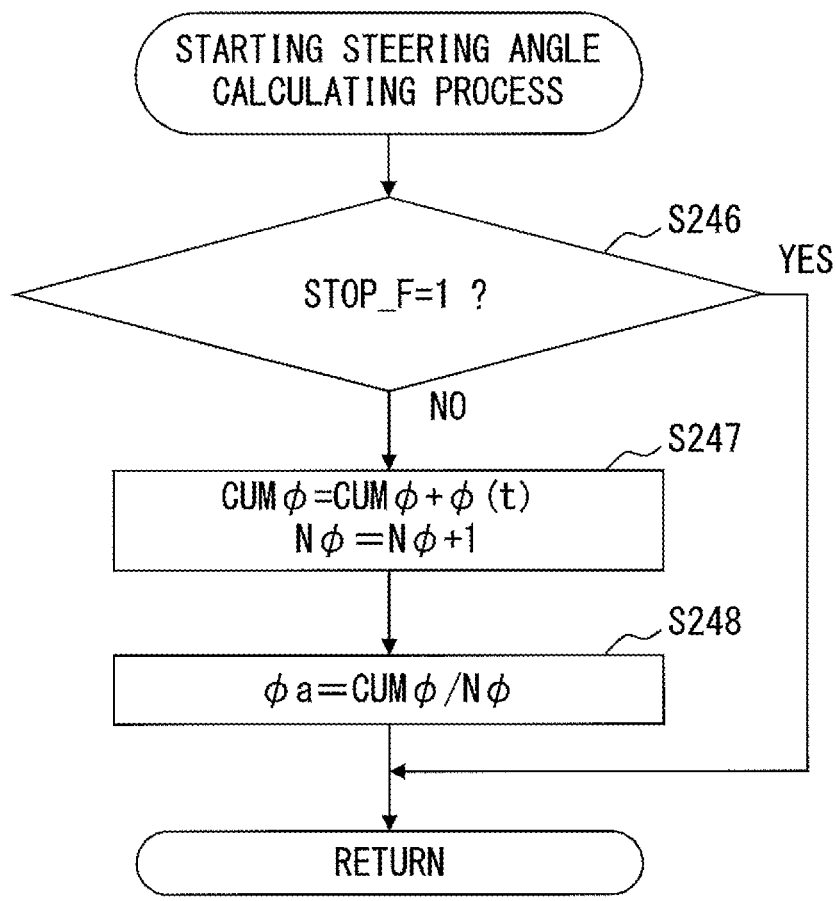
FIG. 21 is a flowchart of a steering angle calculating process according to the second embodiment of the present invention.

FIG. 21 is a flowchart of the steering angle calculating process. The initial value of the cumulative steering angle amount CUM$\phi$ and the initial value of the accumulation frequency N$\phi$ are "0". The steering angle estimation unit 14 estimates a steering angle on the basis of a steering angle accepted by the steering angle acceptance unit 13 at, for example, each specified time from the steering angle sensor 35 of the steering attached to the vehicle 50. The steering angle estimation unit 14 reads the stop flag STOP_F from the cumulative measured value table 184, and returns control to the process in FIG. 18 when the read value is "1" (YES in S251).

When the stop flag is "0" (NO in S251), the steering angle estimation unit 14 adds the steering angle $\phi(t)$ at the measuring time t to the cumulative steering angle amount CUM$\phi$, adds "1" to the accumulation frequency N$\phi$, and updates the cumulative measured value table 184 (S252). That is, the steering angle estimation unit 14 reads the cumulative steering angle amount CUM$\phi$ stored in the cumulative measured value table 184, and adds the input steering angle $\phi(t)$, thereby obtaining the average steering angle in the period when the vehicle 50 is moving.

The steering angle estimation unit 14 sets average steering angle $\phi a$=CUM$\phi$/N$\phi$ (S253). When N$\phi$=0, $\phi a$ may be set to $\phi(t)$ ($\phi a$=$\phi(t)$). Thus, the steering angle estimation unit 14 accumulates and averages the steering angle only when the vehicle 50 is moving, calculates the average steering angle $\phi a$, and outputs the result to the locus estimation unit 15.

The process in S222 performed by the locus estimation unit 15 is described below in detail. Assume that the cumulative wheel speed and the average steering angle from the current reference time to the latest measuring time are the cumulative left wheel speed CUMVL, the cumulative right wheel speed CUMVR, and the average steering angle $\phi a$. In this case, the curvature c of rotation of the vehicle 50 is obtained by means of following equation 20 by replacing the steering angle $\phi$ in equation 12 with the average steering angle $\phi a$.

$$c=\phi a/(L \times \text{sqrt}(\mu^2-\phi a^2)) \quad \text{(equation 20)}$$

Also assume that the root mean square value of the cumulative wheel speed is VRMS, it is obtained by means of following equation 21 using the cumulative left wheel speed CUMVL and the cumulative right wheel speed CUMVR.

$$VRMS=\text{sqrt}((CUMVL^2+CUMVR^2)/2) \quad \text{(equation 21)}$$

Thus, the vehicle speed VRC at the estimated point O1 of the vehicle 50 from the current reference time to the latest measuring time is obtained by means of following equation 22.

$$VRC=k \times VRMS/\text{sqrt}(c^2 \times (L^2+T^2)+1) \quad \text{(equation 22)}$$

In the equation, k is a parameter indicating the sign of the moving speed, and is defined by following equation 23.

$$k = 1 ((CUMVL+CUMVR)/2 >= 0) = \quad \text{(equation 23)}$$
$$-1((CUMVL+CMVR)/2 < 0)$$

The rotation angle $\omega$ of the vehicle 50 is calculated by means of following equation 24.

$$\omega=c \times VRC \quad \text{(equation 24)}$$

The locus estimation unit 15 calculates the rotation amount $\alpha$ and the translation movement amount (qx, qy) of the vehicle 50 from the current reference time to the measuring time immediately before by means of equations 22 and 24. Practically, the relationship indicated by following equation 25 holds true.

$$\alpha=\omega \quad \text{(equation 25)}$$

Furthermore, the vehicle speed VRC indicates the length of the arc when the action of the vehicle 50 from the current reference time to the latest measuring time is a circular movement. When the length of the chord corresponding to the arc is the translation amount TRC, equation 26 holds true.

$$TRC = (2 \times VRC \times \sin(\omega/2))/ \quad \text{(equation 26)}$$
$$\omega(|\omega| \geq \text{rotation judgment threshold } TH\omega) =$$
$$VRC(|\omega| < \text{rotation judgment threshold } TH\omega)$$

In the equation, the rotation judgment threshold TH$\omega$ is a threshold for judgment as to whether or not the rotation angle $\omega$ is very close to 0. Using the translation amount TRC, the translation movement amount (qx, qy) of the vehicle 50 is obtained by means of following equation 27.

$$qx=TRC \times \sin(\omega/2)$$
$$qy=TRC \times \cos(\omega/2) \quad \text{(equation 27)}$$

The locus estimation unit 15 outputs the above-mentioned rotation amount $\alpha$ and translation movement amount (qx, qy) to the locus calculation unit 155, and outputs the translation amount TRC to the reference time update unit 153.

The process of the locus calculation unit 155 is further explained below. The locus calculation unit 155 calculates the rotation amount α and the translation movement amount (qx, qy) on the basis of the cumulative left wheel speed CUMVL, the cumulative right wheel speed CUMVR, and the average steering angle φa, and outputs them outside the locus estimation device 150.

<Calculating amount of rotation and amount of translation in one time period> As illustrated in FIG. 13, the prior time locus table 186 stores the prior time rotation amount αp, the prior time x translation amount qxp, and the prior time y translation amount qyp. The prior time refers to a measuring time immediately before the latest measuring time. In this case, the rotation amount α1 and the translation movement amount (qx1, qy1) from the prior time to the latest measuring time are obtained by means of following equation 28.

$$\alpha 1 = \alpha - \alpha p$$

$$qx1 = \cos(\alpha p) \times (qx - qxp) - \sin(\alpha p) \times (qy - qyp)$$

$$qy1 = \sin(\alpha p) \times (qx - qxp) + \cos(\alpha p) \times (qy - qyp) \quad \text{(equation 28)}$$

The locus calculation unit 155 outputs the rotation amount α1 and the translation movement amount (qx1, qy1) outside the locus estimation device 150. The locus calculation unit 155 also stores the rotation amount α and the translation movement amount (qx, qy) as the rotation amount αp and the translation movement amount (qxp, qyp) in the prior time locus table 186 for preparation of the process at the next measuring time.

The process of the reference time update unit 153 is further described below. The reference time update unit 153 receives the translation amount TRC estimated by the locus estimation unit 15, compares it with the reference time update threshold THK1, and updates the reference time depending on the result of the comparison.

The update of the reference time is performed as follows. That is, when following equation 29 is satisfied, the reference time is updated as the latest measuring time.

$$|TRC| > THK1 \quad \text{(equation 29)}$$

When equation 29 is satisfied, the amount of movement of the vehicle 50 from the reference time exceeds a specified amount.

When the reference time update unit 153 updates the reference time, the following settings are performed in the cumulative measured value DB 164.

$$CUMVL = 0$$

$$CUMVR = 0$$

$$CUM\phi = 0$$

$$N\phi = 0 \quad \text{(equation 30)}$$

With regard to the prior time locus DB 166, the following settings equation 31 are performed in the prior time locus table 186 when the reference time is updated.

$$\alpha p = 0$$

$$qxp = 0$$

$$gyp = 0 \quad \text{(equation 31)}$$

As described above, the locus estimation device 150 according to the second embodiment estimates the locus of a moving object by a circular movement performed only by a movement for a short time, accumulates the amount of rotation and the amount of translation estimated for a short time, thereby estimating the movement locus of any movement of the moving object. A reference time is set for the locus estimation device 150 as a reference of an estimation of a locus. The reference time is not updated at each measuring time, but is updated when a specified condition is satisfied. Until the specified condition is satisfied, the locus from the reference time to the latest measuring time is calculated on the basis of the wheel speed and the steering angle measured at each specified time from the reference time. In this case, a cumulative value from the reference time to the latest measuring time is used as the wheel speed. As the steering angle, an average value from the reference time to the latest measuring time is used. If the amount of translation of the vehicle 50 in the calculated locus exceeds the reference time update threshold THK1, the reference time is updated at the latest measuring time. Furthermore, the locus estimation device 150 outputs as a locus the amount of rotation and the amount of translation on the basis of the difference between the locus from the reference time to the latest measuring time and the locus from the reference time to the measuring time immediately before the latest measuring time.

As described above, the locus estimation device 150 does not update the reference time at each measuring time in time series, but fixes the time within a specified condition, and updates only measuring times in a time series. When the estimated amount of translation from the reference time to the latest measuring time exceeds a specified reference time update threshold THK1, the amount of rotation and the amount of translation are estimated, and the latest measuring time is updated as a new reference time. Thus, by configuring the translation distance in estimating a locus as longer than a specified distance, the occurrence of accumulated error by accumulating a rotation angle and an amount of translation may be prevented. Thus, if a locus is described as a single circular movement or a linear movement, the reference time is not updated, and the reference time may be updated when the type of movement is changed. Therefore, since the range of a single movement evaluates the cumulative value of a wheel speed over a long distance in a period, the error included in the accumulated wheel speed may be reduced, and the accuracy of the estimation value of the rotation and the translation may be improved. Thus, for example, a measured value is discretely acquired, and error caused by adding the locus calculated by approximating the locus by a circular movement may be reduced, thereby estimating the locus of a moving object with high accuracy.

The amount of rotation and the amount of translation are estimated at each measuring time, and are converted into an amount of rotation and an amount of translation from the measuring time immediately before, and output externally. By outputting the deviation between the locus up to the measuring time immediately before and the locus up to the latest measuring time, a locus is estimated on the basis of the estimation value from the reference time. Therefore, cumulative error is not included.

In addition, when the moving speed of the vehicle 50 is low, the amount of movement in a specified time is small. Therefore, it is considered that error of an amount of movement may develop. However, the locus estimation device 150 may reduce the error by performing estimation for a long distance. Accordingly, the locus estimating method of the locus estimation device 150 may be used for the vehicle 50 driven at a low speed. Furthermore, although there is movement of the vehicle 50 with a change in the time series, the amount of rotation and the amount of translation may be estimated with high accuracy.

(Third embodiment) Described below is a locus estimation device 250 according to a third embodiment of the present invention. In the third embodiment, configuration elements and operations similar to those of the locus estimation device 1 or the locus estimation device 150 are assigned the same reference numerals, and duplicate explanation is omitted. An example of a hardware configuration of the locus estimation device 250 is similar to the example of the locus estimation device 1.

Figure 22:
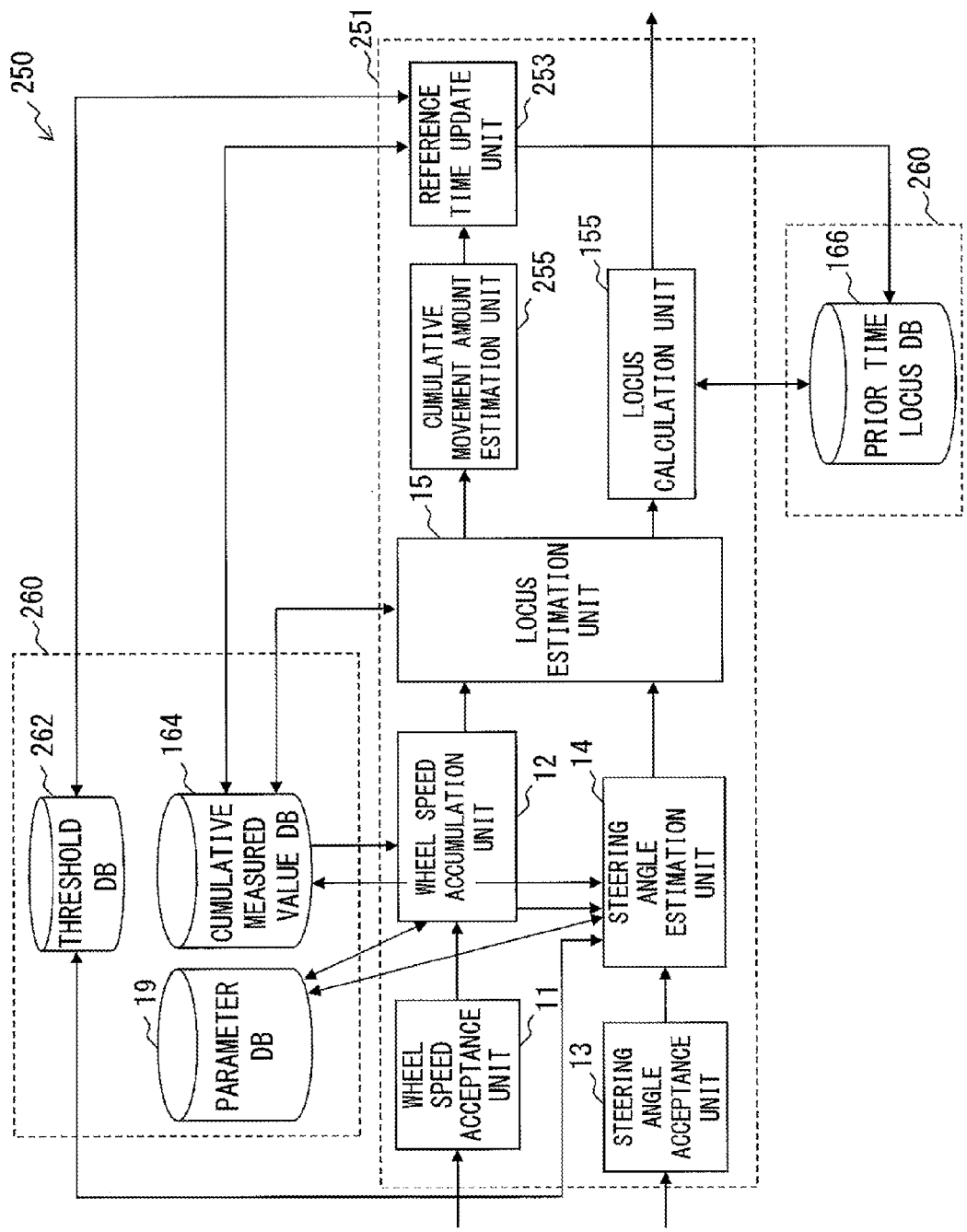
FIG. 22 is a block diagram of an example of a functional configuration of a locus estimation device according to a third embodiment of the present invention.

FIG. 22 is a block diagram of an example of a functional configuration of the locus estimation device 250 according to the third embodiment. The locus estimation device 250 accepts measured values of the wheel speed and the steering angle which have been measured at each specified measuring time. The locus estimation device 250 sets a reference time from among the measuring times as with the locus estimation device 150 according to the second embodiment, estimates the locus from the latest reference time to the latest measuring time, and estimates the locus from the measuring time immediately before to the latest measuring time on the basis of the estimated locus. Furthermore, the locus estimation device 250 updates the reference time on the basis of the locus of the vehicle 50 from the reference time. The locus estimation device 250 differs from the locus estimation device 150 according to the second embodiment in its reference time updating method.

The locus estimation device 250 includes an processing unit 251 and a storage unit 260. As compared with the processing unit 151 in the locus estimation device 150 according to the second embodiment, the processing unit 251 includes a reference time update unit 253 instead of the reference time update unit 153, and further includes a cumulative movement amount estimation unit 255.

The cumulative movement amount estimation unit 255 calculates backward the cumulative wheel speed from the locus estimated by the locus estimation unit 15, and outputs the result to the reference time update unit 253. The reference time update unit 253 updates the reference time when it is judged that the reference time is to be updated on the basis of the estimation result by the locus estimation unit 15 and the calculation result by the cumulative movement amount estimation unit 255. Details of the judgment on the update of the reference time are described later.

The storage unit 260 includes a threshold DB 262 in addition to the parameter DB 19, the cumulative measured value DB 164, and the prior time locus DB 166. FIG. 23 is an example of a threshold table 275. The threshold table 275 is an example of the data structure of data stored in the threshold DB 262. The threshold table 275 includes a cumulative wheel speed difference threshold THK2 in addition to each parameter of the threshold table 182 explained with regard to the second embodiment. The cumulative wheel speed difference threshold THK2 indicates the amount of maximum wheel speed difference with the real number not updated, and is a real number representing, for example, centimeters.

Figure 24:
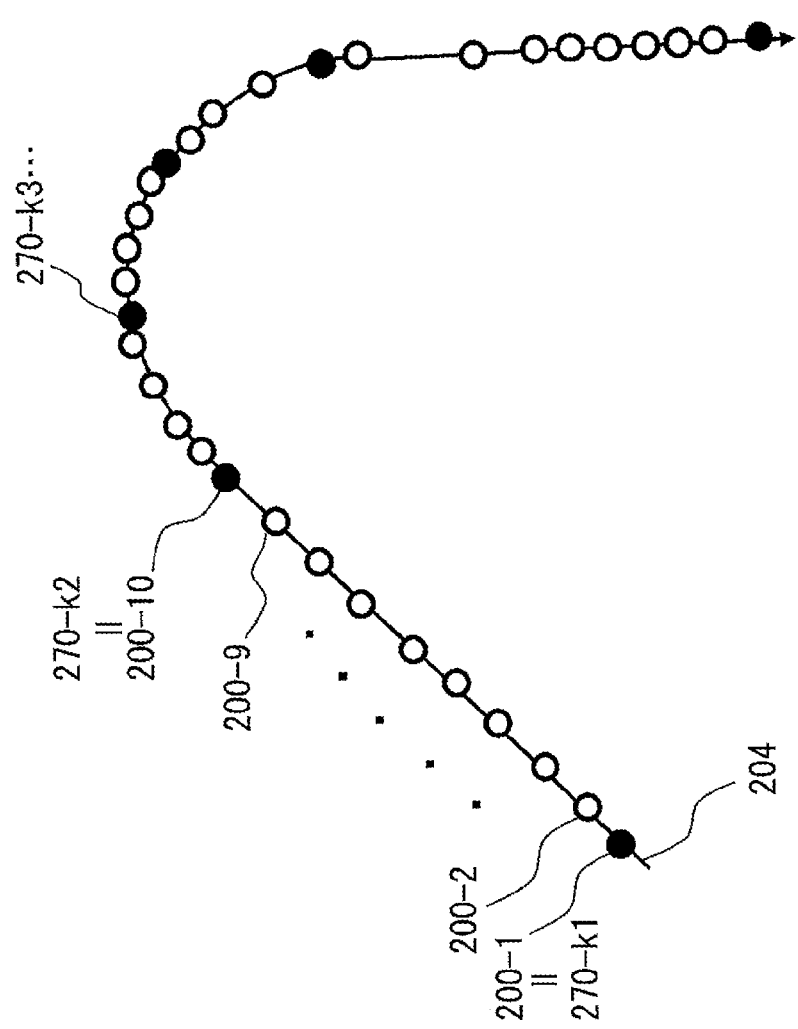
FIG. 24 is an explanatory illustration of a locus estimating method according to the third embodiment of the present invention.
Figure 25:
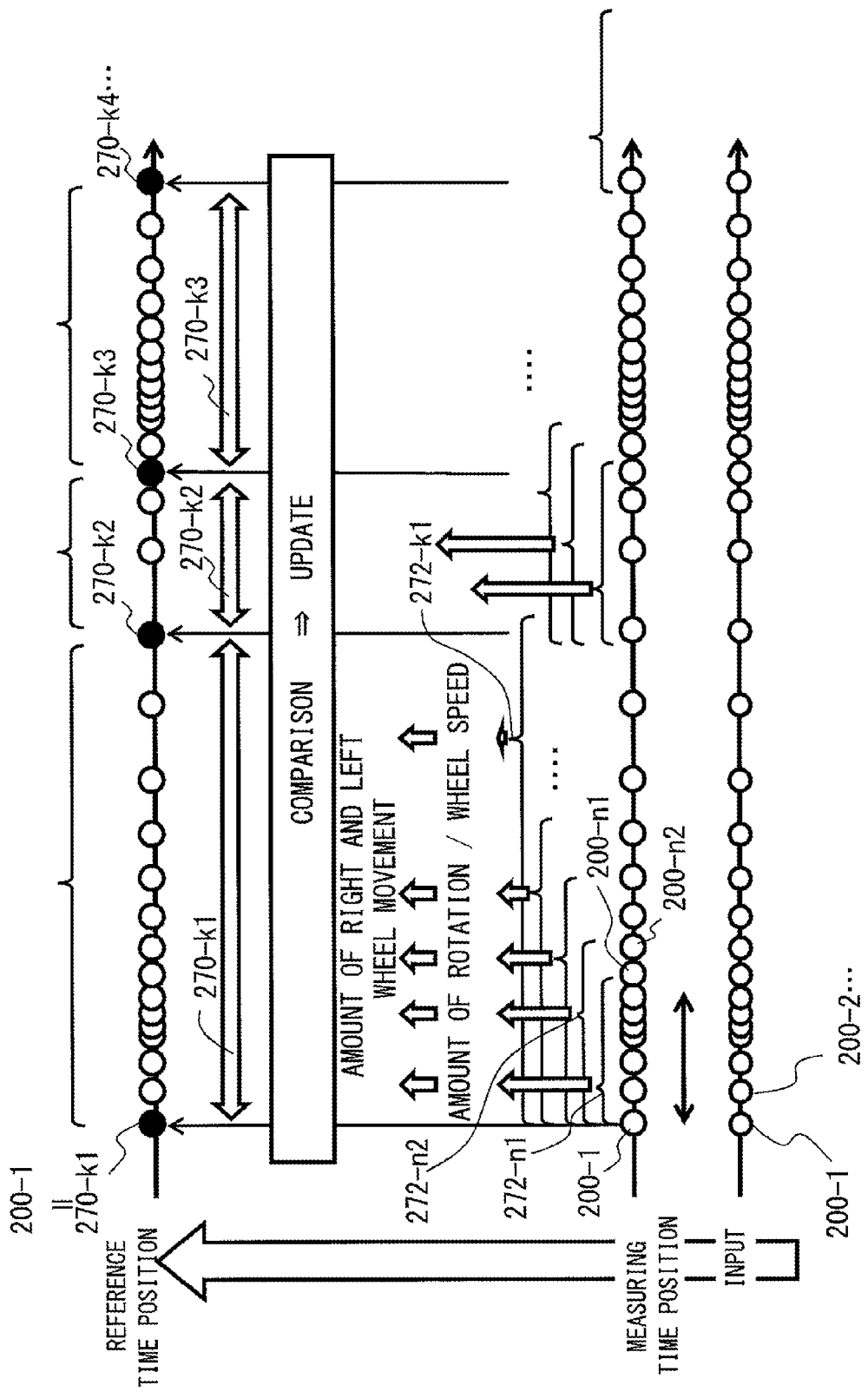
FIG. 25 is an explanatory illustration of a locus estimating method according to the third embodiment of the present invention.

FIGS. 24 and 25 are explanatory illustrations of a locus estimating method according to the present embodiment. As illustrated in FIG. 24, the measuring time estimated positions 200-1, 200-2, . . . (also referred to collectively as measuring time estimated positions 200) indicate the estimated positions of the vehicle 50 at each specified wheel speed measuring time. The locus 204 is a curve which connects the measuring time estimated positions 200, and is an estimated movement locus of the vehicle 50. In this case, the reference time estimated positions 270-k1, 270-k2, . . . indicate the estimated positions of the vehicle 50. According to the present embodiment, when the wheel speed calculated backward from the estimated distance of translation from the reference time and the cumulative wheel speed exceed the cumulative wheel speed difference threshold THK2, the latest measuring time is defined as a new reference time. The estimated position at each measuring time is estimated on the basis of the cumulative wheel speed from the latest reference time to the latest measuring time, and the average steering angle. The method of calculating the estimated position output corresponding to each measuring time is similar to the method according to the second embodiment.

FIG. 25 is an explanatory illustration of reducing cumulative error by reference time selection according to the present embodiment. As illustrated in FIG. 25, for example, input of the wheel speed and the steering angle is performed at times corresponding to the measuring time estimated positions 200-1, 200-2, . . . . The reference time is, for example, updated when the difference between the wheel speed calculated backward from the estimated amount of translation from the reference time estimated position 270-k1 to the measuring time estimated position 200-n1 and the cumulative wheel speed stored in the cumulative measured value table 184 exceeds the cumulative wheel speed difference threshold THK2. The estimation of a locus is performed on the basis of the measurement results of the wheel speed and the steering angle from the reference time to the measuring time and the steering angle. The estimation result to be output is calculated on the basis of the estimation result from the reference time to the prior measuring time and the estimation result from the reference time to the latest measuring time.

Figure 26:
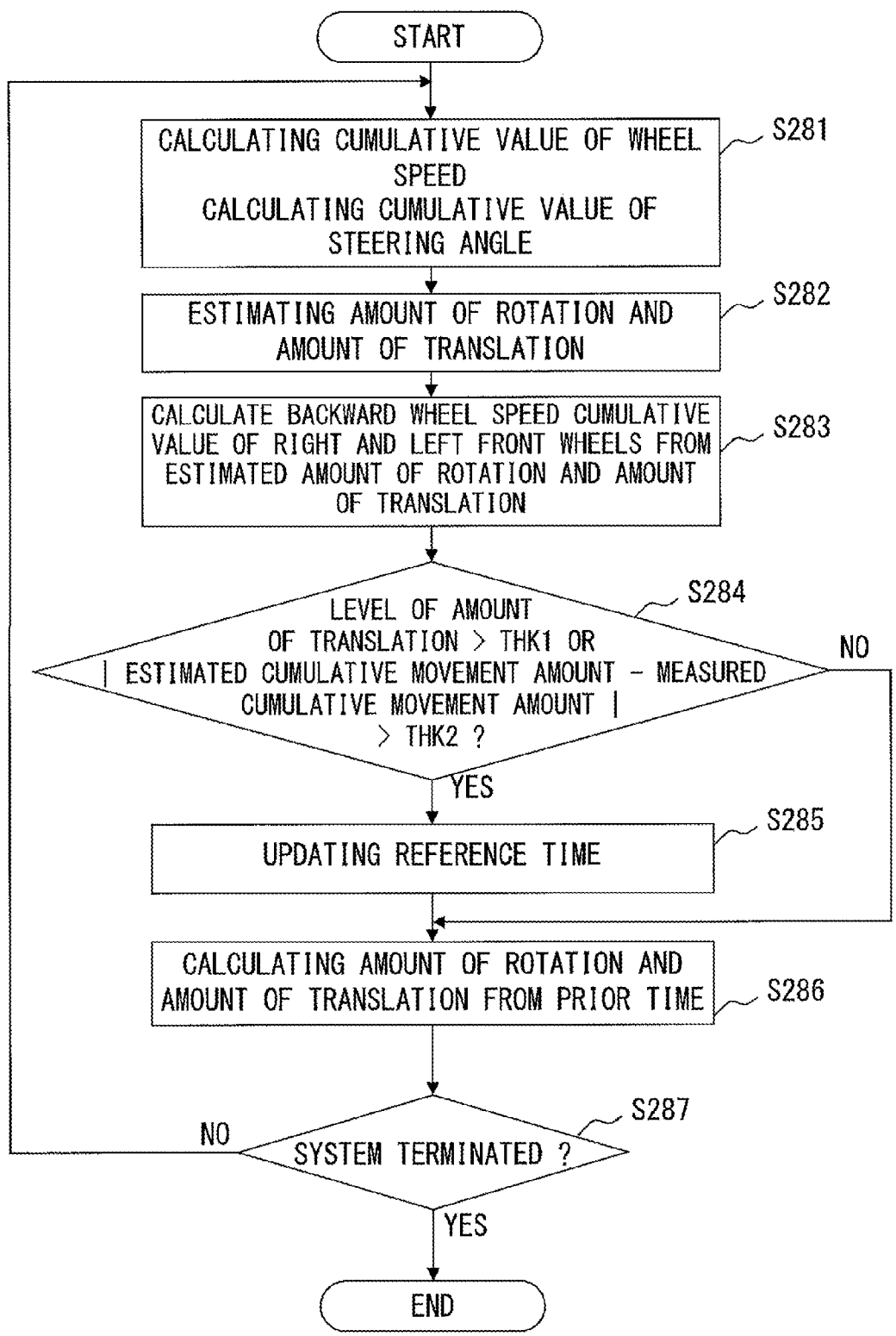
FIG. 26 is a flowchart of the main process of the locus estimation device according to the third embodiment of the present invention.

The operation of the locus estimation device 250 according to the third embodiment is described below with reference to FIG. 26. FIG. 26 is a flowchart of the main process of the locus estimation device 250. As illustrated in FIG. 26, in the locus estimation device 250, the wheel speed accumulation unit 12 accumulates the measured values of the wheel speed accepted by the wheel speed acceptance unit 11, and stores the accumulated value in the cumulative measured value DB 164. When wheel speed accumulation unit 12 judges that the vehicle 50 is moving, the steering angle estimation unit 14 accumulates the measured values of the steering angle accepted by the steering angle acceptance unit 13, calculates an average steering angle, and stores the cumulative value in the cumulative measured value DB 164 (S281). The process in S281 is similar to the process in S221 according to the second embodiment.

The locus estimation unit 15 estimates the amount of rotation and the amount of translation as in the first and second embodiments on the basis of the cumulative wheel speed stored in the cumulative measured value DB 164 as in the cumulative measured value table 184 and the calculated average steering angle (S282). The details of the process in S282 are similar to the process in S222 according to the second embodiment.

The cumulative movement amount estimation unit 255 calculates backward the wheel speed cumulative value of a left front wheel and a right front wheel from the amount of rotation and the amount of translation estimated in S282 (S283). The details of the process are described later.

When the estimated amount of translation is more than the reference time update threshold THK1, or when the absolute value of the difference between the calculated wheel speed cumulative value and the measured wheel speed cumulative value is more than the cumulative wheel speed difference threshold THK2 (YES in S284), the reference time update unit 253 updates the reference time (S285). When the estimated amount of translation is not more than the reference time update threshold THK1 and the absolute value of the difference between the calculated wheel speed cumulative value and the measured wheel speed cumulative value is not more than the cumulative wheel speed difference threshold THK2 (NO in S284), the reference time update unit 253 passes control to S286.

The locus calculation unit 155 calculates the amount of rotation and the amount of translation from the prior time on the basis of the prior time locus table 186, the estimated rotation angle α, and the amount of translation (dx, dy) (S286). The processing unit 251 judges whether or not an operation etc. for termination of the system has been performed. If there has not been such an operation (NO in S287), then the processing unit 251 repeats the processes from S281. If there has been such an operation (YES in S286), then the processing unit 251 terminates the locus estimating process.

Details of the processes in S283 and S284 are described below. The locus estimation device 250 performs the cumulative operations on the wheel speed and the steering angle as with the locus estimation device 150, and the locus estimation unit 15 calculates the rotation amount α of the vehicle 50 from the reference time immediately before to the latest measuring time, and the amount of translation (qx, qy). The locus estimation unit 15 outputs the rotation amount α and the translation movement amount (qx, qy) to the locus calculation unit 155, and outputs the rotation amount α, the wheel speed VRC, and the translation amount TRC to the cumulative movement amount estimation unit 255.

In the third embodiment, the cumulative movement amount estimation unit 255 receives the rotation amount α, the translation movement amount (qx, qy), and the translation amount TRC from the reference time to the latest measuring time, and calculates each cumulative wheel speed of the left front wheel 52 and the right front wheel 54. The cumulative movement amount estimation unit 255 compares the calculated cumulative wheel speed with the cumulative left wheel speed CUMVL and the cumulative right wheel speed CUMVR, and outputs the difference and the translation movement amount (qx, qy) to the reference time update unit 253.

<Calculation of cumulative wheel speeds of right and left front wheels> Following equation 32 holds true from the basic equation of rotation movement relating to the estimated rotation amount α, vehicle speed VRC, and curvature c of the vehicle 50 from the reference time to the latest measuring time.

$$\alpha = c \times VRC \quad \text{(equation 32)}$$

Therefore, the rotation radius RRC at the estimated point O1 is expressed by following equation 33.

$$RRC = 1/c = VRC/\alpha \quad \text{(equation 33)}$$

Left radius RFL and right radius RFR as the respective rotation radii of the left front wheel 52 and the right front wheel 54 are expressed by following equation 34.

$$RFL = sqrt((RRC+T)^2 + L^2)$$

$$RFR = sqrt((RRC-T)^2 + L^2) \quad \text{(equation 34)}$$

Therefore, estimated left wheel speed EVL and estimated right wheel speed EVR of the respective wheel speeds of the left front wheel 52 and the right front wheel 54 are expressed by following equation 35.

$$EVL = RFL \times \alpha = sqrt((RRC+T)^2 + L^2) \times \alpha = \quad \text{(equation 35)}$$
$$sqrt((VRC/\alpha + T)^2 + L^2) \times \alpha =$$
$$k \times sqrt((VRC + \alpha \times T)^2 + (\alpha \times L)^2)$$
$$EVR = RFR \times \alpha = sqrt((RRC-T)^2 + L^2) \times \alpha =$$
$$sqrt((VRC/\alpha - T)^2 + L^2) \times \alpha =$$
$$k \times sqrt((VRC - \alpha \times T)^2 + (\alpha \times L)^2)$$

where k indicates a parameter which expresses the sign of a moving speed, and is defined as shown below.

$$K = 1(VRC \geq 0) = -1(VRC < 0) \quad \text{(equation 36)}$$

<Difference between wheel speed cumulative value and estimated wheel speed cumulative value> A difference value DIFF, which is stored in the cumulative measured value table 184, between the cumulative left wheel speed CUMVL and cumulative right wheel speed CUMVR on the basis of the measured values, and the estimated left wheel speed EVL and estimated right wheel speed EVR, is defined by equation 37.

$$DIFF = MIN(|CUMVL - EVL|, |CUMVR - EVR|) \quad \text{(equation 37)}$$

The cumulative movement amount estimation unit 255 outputs the difference value DIFF to the reference time update unit 253.

<Judging reference time update> The reference time update unit 253 receives the estimated translation amount TRC and the difference value DIFF, judges the necessity of a reference time update, and updates the reference time as necessary. The reference time update unit 253 updates the reference time when following equation 38 is satisfied.

$$TRC > THK1 \text{ or } |DIFF| > THK2 \quad \text{(equation 38)}$$

When the reference time update unit 253 updates the reference time, equations 30 and 31 are set in the cumulative measured value table 184 as in the second embodiment.

As explained above, the locus estimation device 250 according to the third embodiment has a similar effect to that of the locus estimation device 150 according to the second embodiment. Furthermore, since judgment as to a real number update is performed by introducing the difference value DIFF, a locus may be estimated with accuracy although the type of movement has been changed with a smaller translation amount TRC. That is, the cumulative wheel speed is calculated backward from the estimated amount of translation, and compared with the cumulative wheel speed on the basis of the measured value, thereby judging a case where movement of the vehicle 50 is not described by a circular movement. Therefore, when movement of the vehicle 50 is not described by a circular movement, the reference time is updated, and cumulative error may be reduced. The reference time update unit 253 may judge only on the basis of the difference value DIFF, without the reference time update threshold THK1.

(Variation example) A variation example based on each of the first through third embodiments is described below. The present variation example is an example of the process of the locus estimation unit 15 according to the first through third embodiments. In the present variation example, configuration elements and operations similar to those of the locus estimation device 1, the locus estimation device 150 or the locus estimation device 250 according to the first through third embodiments are assigned the same reference numerals to avoid duplicate explanation. An example of the hardware configuration of the locus estimation device in the present variation example is similar to the example of the locus estimation device 1.

Described below is the process of the locus estimation unit 15 according to the present variation example. In the present variation example, the locus estimation unit 15 estimates a locus on the basis of the wheel speed and the steering angle, or the wheel speed cumulative value and the average steering angle. The process on the basis of the wheel speed cumulative value and the average steering angle is explained below as with the process according to the second or third embodiment, but a similar method may also be applied to the first embodiment.

In the present variation example, equations 20, 33, and 34 according to the second embodiment are used as described below for comprehensibility.

$$c = \phi a/(L \times sqrt(\mu^2 - \phi a^2)) \quad \text{(equation 20)}$$

$$RRC = 1/c \quad \text{(equation 33)}$$

$$RFL = sqrt((RRC+T)^2 + L^2)$$

$$RFR = sqrt((RRC-T)^2 + L^2) \quad \text{(equation 34)}$$

Assuming that the angular velocity is ω in the estimated circular movement, the left front wheel speed VFL of the left front wheel 52, and the right front wheel speed VFR of the right front wheel 54, are obtained by following equation 39.

$$VFL = RFL \times \omega$$

$$VFR = RFR \times \omega \quad \text{(equation 39)}$$

When equation 39 is expressed by a matrix expression, it is expressed by following equation 40.

$$\begin{pmatrix} VFL \\ VFR \end{pmatrix} = \begin{pmatrix} RFL \\ RFR \end{pmatrix} \omega \quad \text{(equation 40)}$$

When equation 40 is solved by the least squares method using a pseudo-inverse matrix, equation 41 is solved.

$$\omega = \left[ (RFL \; RFR) \begin{pmatrix} RFL \\ RFR \end{pmatrix} \right]^{-1} (RFL \; RFR) \begin{pmatrix} VFL \\ VFR \end{pmatrix} \quad \text{(equation 41)}$$

Equation 41 is solved and equation 42 is obtained.

$$\omega = (RFL \times VFL + RFR \times VFR)/(RFL^2 + RFR^2) = \quad \text{(equation 42)}$$

$$(sqrt((RRC+T)^2 + L^2) \times VFL +$$

$$sqrt((RRC-T)^2 + L^2) \times VFR)/$$

$$(2 \times (RRC^2 + L^2 + T^2)) =$$

$$(sqrt((1/c+T)^2 + L^2) \times VFL +$$

$$sqrt((1/c-T)^2 + L^2) \times VFR)/$$

$$(2 \times ((1/c)^2 + L^2 + T^2)) =$$

$$c \times (sqrt((1+c \times T)^2 + c \times L^2) \times VFL +$$

$$sqrt((1-c \times T)^2 + c \times L^2) \times VFR)/$$

$$(2 \times ((c^2 \times (L^2 + T^2)) + 1))$$

Therefore, the vehicle speed VRC of the vehicle 50 at the estimated point O1 is expressed by following equation 43.

$$VRC = \quad \text{(equation 43)}$$

$$RRC \times \omega = \omega/c = (sqrt((1 + c \times T)^2 + c \times L^2) \times VFL +$$

$$sqrt((1 - c \times T)^2 + c \times L^2) \times VFR)/$$

$$(2 \times ((c^2 \times (L^2 + T^2) + 1))$$

In the second or third embodiment, the left front wheel speed VFL and the right front wheel speed VFR are obtained by means of the cumulative left wheel speed CUMVL and the cumulative right wheel speed CUMVR. Therefore, equation 43 is transformed as following equation 44.

$$VRC = (sqrt((1+c \times T)^2 + c \times L^2) \times CUMVL + sqrt((1-c \times T)^2 + c \times L^2) \times CUMVR)/(2 \times ((c^2 \times (L^2+T^2)+1)) \quad \text{(equation 44)}$$

Next, the rotation amount α and the translation movement amount (qx, qy) of the vehicle 50 from the reference time and the latest measuring time are calculated from the vehicle speed VRC and the rotation amount ω above. Practically, they are obtained by equations 26 and 27 according to the second embodiment.

The rotation amount α and the translation movement amount (qx, qy) calculated as described above are output to the locus calculation unit 155. When they are applied to the third embodiment, the rotation amount α, the vehicle speed VRC, and the translation amount TRC are output to the cumulative movement amount estimation unit 255. When the present variation example is applied to the locus estimation device 1 according to the first embodiment, equations 1, 7, and 12 may replace equations 20, 33, and 34.

As explained above, the present variation example may be the variation example according to the first through third embodiments. According to the present variation example, for example, although there may be a variance in value due to error between the measured left front wheel speed VFL and right front wheel speed VFR, a locus may be estimated with high accuracy through use of the least squares method.

(Fourth embodiment) Described below is a locus estimation device 450 according to a fourth embodiment. In the fourth embodiment, configuration elements and operations similar to those of the locus estimation device 1, the locus estimation device 150, or the locus estimation device 250 are assigned the same reference numerals to avoid duplicate explanation.

Figure 27:
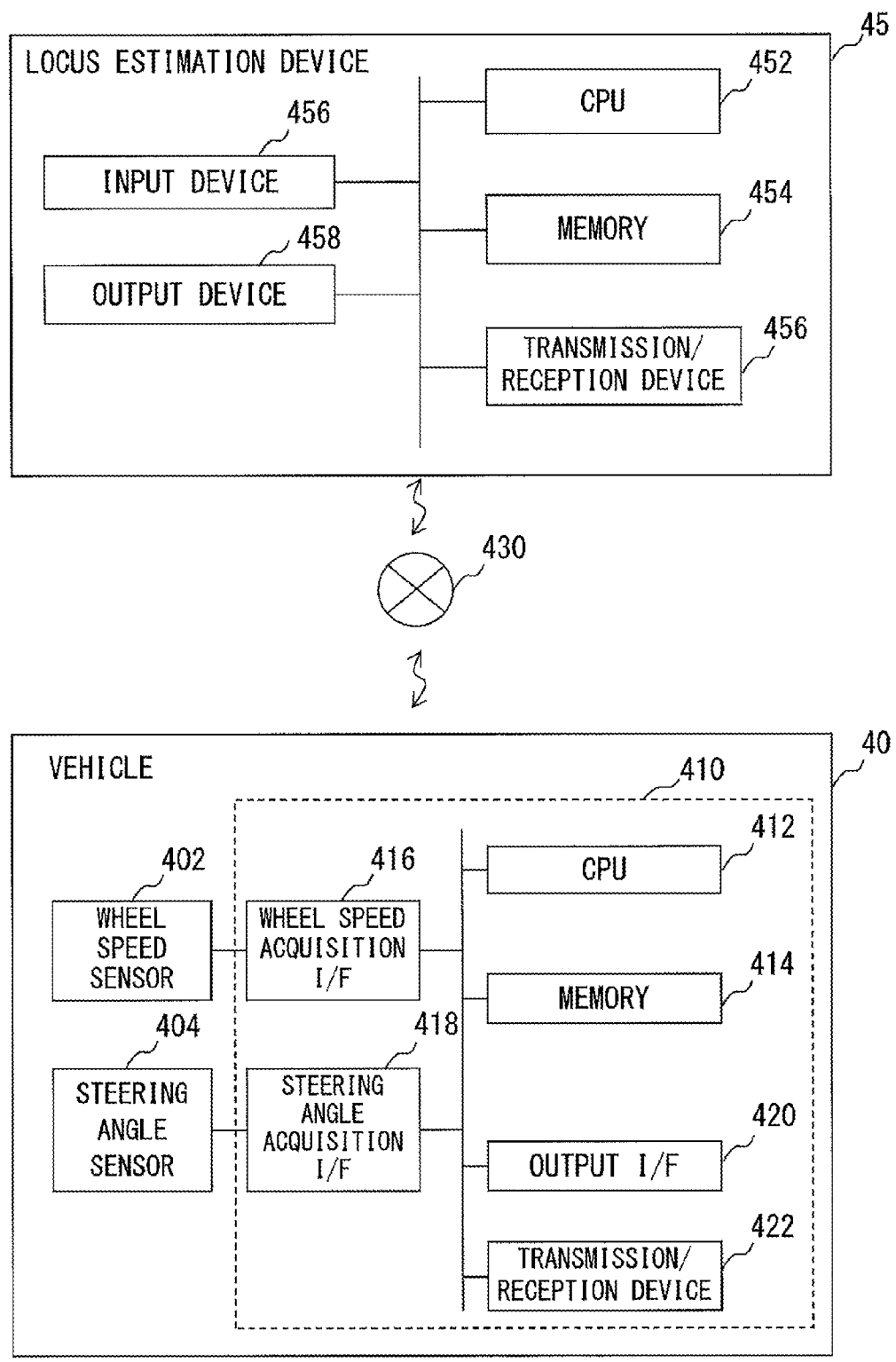
FIG. 27 is an example of a configuration of a locus estimation device according to a fourth embodiment of the present invention.

The locus estimation device 450 according to the fourth embodiment is connected to a detection device 410 through a communication network 430. FIG. 27 illustrates a configuration of the locus estimation device 450 and the detection device 410 according to the fourth embodiment.

As illustrated in FIG. 27, the detection device 410 is installed in a vehicle 400. The detection device 410 detects the left front wheel speed VFL, the right front wheel speed VFR, and the cumulative steering angle amount CUMφ using a wheel speed sensor 402 and a steering angle sensor 404 provided for the vehicle 400, and transmits them to the locus estimation device 450 through the communication network 430. The locus estimation device 450 receives a measured value from the detection device 410, and estimates the locus of the vehicle 400.

The detection device 410 includes a CPU 412, memory 414, a wheel speed acquisition I/F 416, a steering angle acquisition I/F 418, an output I/F 420, and a transmission/reception device 422. The CPU 412 is an processor which controls the operation of the detection device 410. The CPU 412 performs a controlling process as the detection device 410 by, for example, reading a control program stored in advance in the memory 414 and executing the program. The memory 414 is, for example, a read-only storage device, a storage device allowing reading and writing of data at any time, etc. The wheel speed acquisition I/F 416 is an interface device which performs management when accepting the wheel speeds of the right and left front wheels from the wheel speed sensor 402. The steering angle acquisition I/F 418 is an interface device which performs management when accepting from the steering angle sensor 404 a turning angle of a steering wheel which changes the direction of the front wheels of a vehicle. The output I/F 420 is an interface device which performs management when outputting a locus estimation result. The transmission/reception device 422 is a transmission/reception device which performs communications with the locus estimation device 450 through the communication network 430.

The locus estimation device 450 includes a CPU 452, memory 454, an input device 456, an output device 458, and a transmission/reception device 460. The CPU 452 is an processor which controls the operation of the locus estimation device 450. The CPU 452 performs control as the locus estimation device 450 by, for example, reading a control program stored in advance in the memory 454, and executing the program. The memory 454 is, for example, a read-only storage device, a storage device allowing reading and writing of data at any time, etc. The input device 456 accepts a wheel speed, a steering angle, etc. from the detection device 410. The output device 458 outputs a result. The transmission/reception device 460 communicates with the detection device 410 through the communication network 430. The locus estimation device 450 may be the locus estimation device 1, the locus estimation device 150, or the locus estimation device 250 according to the first through fourth embodiments or variation examples.

With the above-mentioned configuration, the locus estimation device 450 may estimate a locus of the vehicle 400 through the communication network 430 on the basis of a measured value measured by the vehicle 400. The locus estimation device 450 may obtain a similar effect by using any of the first through third embodiments. According to one embodiment, the movement locus of a moving object may be estimated with high accuracy.

Figure 28:
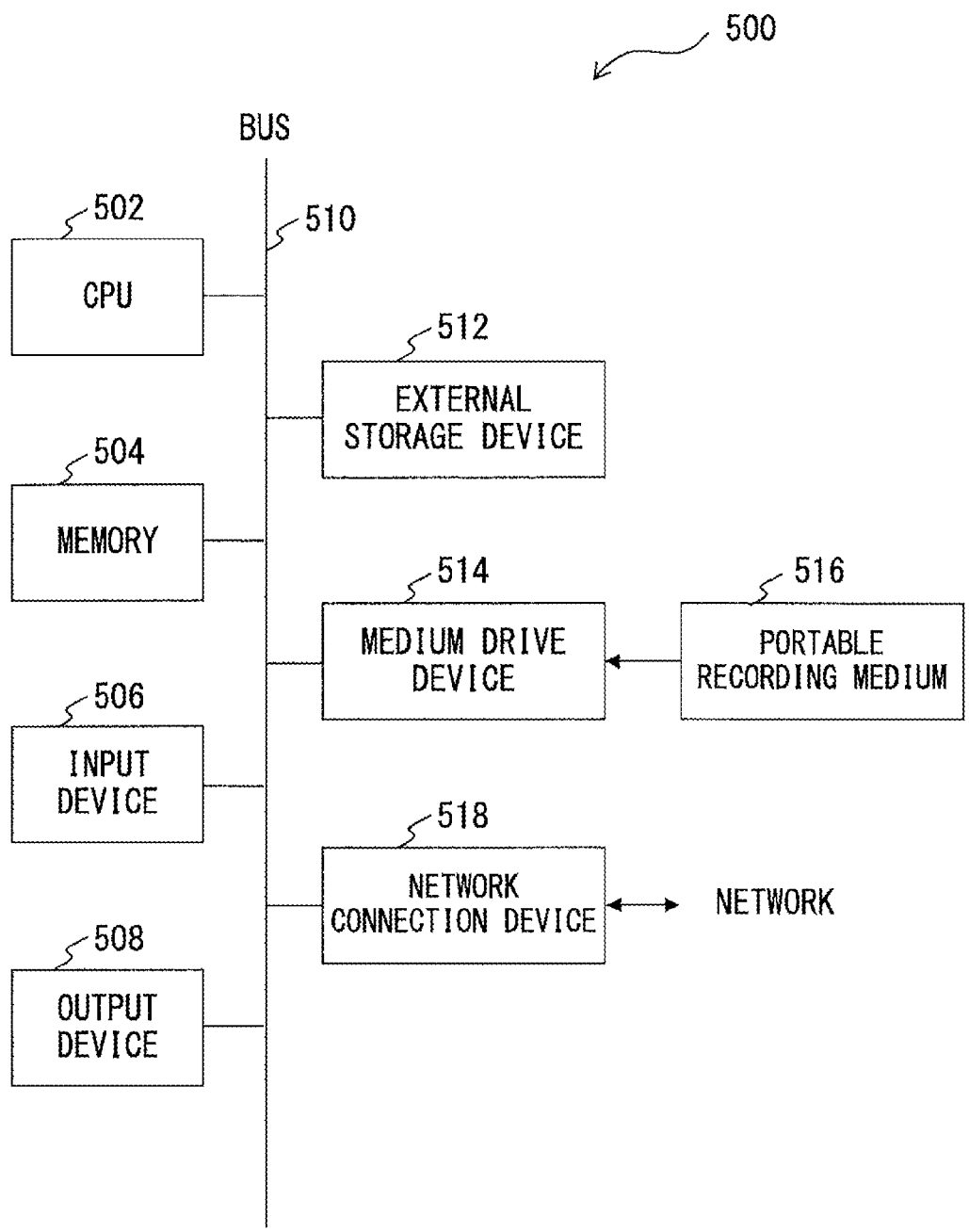
FIG. 28 is an example of a hardware configuration of a standard computer.

Described below is an example of a computer commonly applied to perform an operation of a locus estimating method according to the first through fourth embodiments and variation examples. FIG. 28 is a block diagram of an example of a hardware configuration of a standard computer. As illustrated in FIG. 28, a computer 500 includes a central processing unit (CPU) 502, memory 504, an input device 506, an output device 508, an external storage device 512, a medium drive device 514, a network connecting device, etc., connected through a bus 510.

The CPU 502 is a processor which controls the operation of the entire computer 500. The memory 504 is a storage unit which stores in advance a program for control of the operation of the computer 500, and which is used by the computer 500 as a work area as necessary when executing the program. The memory 504 is, for example, random access memory (RAM), read only memory (ROM), etc. The input device 506 is a device which acquires input of various types of information from a computer user corresponding to the operation contents when the computer user operates the input device 506, and transmits the acquired input information to the CPU 502, and a keyboard device, a mouse device, etc. The output device 508 outputs a process result from the computer 500, and includes a display device etc. For example, a display device displays text and an image depending on display data transmitted by the CPU 502.

The external storage device 512 is, for example, a storage device such as a hard disk etc., and stores various types of control programs executed by the CPU 502, acquired data, etc. The medium drive device 514 is a device which writes and reads data to and from a portable recording medium 516. The CPU 502 may perform various controlling processes by reading and executing a specified control program stored in the portable recording medium 516 through the medium drive device 514. The portable recording medium 516 may be, for example, a compact disc (CD)-ROM, a digital versatile disc (DVD), universal serial bus (USB) memory, etc. A network connection device 518 is an interface device which performs management for communication of various data performed with an external unit by cable or wireless. The bus 510 is a communication path which connects each of the above-mentioned devices for communication of data.

A program for directing a computer to perform a locus estimating method according to the first through fourth embodiments described above is stored in, for example, the external storage device 512. The CPU 502 reads a program from the external storage device 512, and allows the computer 500 to perform an operation of estimating a locus. In this case, a control program for directing the CPU 502 to perform the process of estimating a locus is first generated and stored in the external storage device 512. Then, a specified instruction is provided to the CPU 502 from the input device 506, and the control program is read from the external storage device 512 and executed. Furthermore, the program may be stored in the portable recording medium 516.

The present invention is not limited to the embodiments described above, but may have various configurations or embodiments within the scope of the gist of the present invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A locus estimation device, comprising:
a storage device which stores a distance between right and left front wheels and right and left rear wheels provided behind the front wheels in a moving object in a traveling direction of the moving object, a distance between the right and left front wheels in a direction of axles of the moving object, and a constant depending on a steering angle and a rotation radius of the moving object at the steering angle; and
a processor configured to
accept a measured value of a wheel speed of the right and left front wheels,
accept a measured value of a steering angle at which the traveling direction of the moving object is changed,
estimate an amount of a rotation of a middle point of a rotation center of the right and left rear wheels on a circle having a center which is a point on a straight line passing through the rotation center of the right and left rear wheels, and an amount of translation of the middle point using a least squares method on the basis of the measured value of the wheel speed of the right and left front wheels, the measured value of the steering angle, the distance in the traveling direction of the body of the moving object, the distance in the direction of the axles of the moving object, and the constant, the estimated amount of the rotation of the middle point and the estimated amount of the translation of the middle point being used to estimate an actual driving locus of a movement of the moving object, and control the moving object based on the estimated driving locus of a movement of the moving object.

2. The device according to claim 1, wherein the processor further estimates the amount of rotation and the amount of translation by calculating the rotation radius of the circle by assuming that the left front wheel of the right and left front wheels is connected to a first axis which changes an angle of the left front wheel, the right front wheel is connected to a second axis which changes an angle of the right front wheel, the first and second axes are connected to a third axis at a right angle, and the steering angle is converted into a displacement in the direction of the third axis.

3. The device according to claim 1, wherein, the processor further accumulates the wheel speed of the right and left front wheels measured at each specified time from a reference time of an estimation of the amount of rotation and the amount of translation until the reference time is updated; estimates an average steering angle from the reference time to a latest measuring time; updates the reference time; calculates the amount of rotation and the amount of translation depending on the measuring time at each specified time on the basis of the accumulated wheel speed of the right and left front wheels and the average steering angle; estimates the amount of rotation and the amount of translation from the reference time to the latest measuring time on the basis of the accumulated wheel speed of the right and left wheels, and the average steering angle; updates the reference time at the latest measuring time when the estimated amount of translation satisfies a specified condition for suppression of an increasing error of the amount of rotation or the amount of translation; and calculates the amount of rotation and the amount of translation of the moving object depending on the latest measuring time on the basis of the estimated amount of rotation and amount of translation.

4. The device according to claim 3, wherein:
the condition is that the amount of translation of the moving object from the estimated reference time to the latest measuring time is not less than a reference time update threshold; and
the processor further calculates the amount of rotation and the amount of translation of the moving object from a measuring time immediately before the latest measuring time to the latest measuring time as the amount of rotation and the amount of translation depending on the latest measuring time on the basis of the estimated amount of rotation and amount of translation.

5. The device according to claim 3, wherein the processor further calculates backward a left wheel speed and a right wheel speed of the right and left front wheels from the amount of rotation and the amount of translation of the moving object from the estimated reference time to the latest measuring time, and compares a calculation result with the accumulated left wheel speed or the right wheel speed, and calculates the amount of rotation and the amount of translation of the moving object from a measuring time immediately before the latest measuring time to the latest measuring time as the amount of rotation and the amount of translation depending on the latest measuring time on the basis of the estimated amount of rotation and amount of translation; and the condition is that a difference between the backward calculated left wheel speed or right wheel speed of the right and left front wheels is within a second specified amount.

6. A locus estimating method, comprising:
storing, by a storage device, a distance between right and left front wheels and right and left rear wheels provided behind the front wheels in a moving object in a traveling direction of the moving object, a distance between the right and left front wheels in a direction of axles of the moving object, and a constant depending on a steering angle and a rotation radius of the moving object at the steering angle;
accepting, by a processor, a measured value of a wheel speed of right and left front wheels of the moving object, and a measured value of a steering angle at which the traveling direction of the moving object is changed;
estimating, by the processor, an amount of a rotation of a middle point of a rotation center of the right and left rear wheels on a circle having a center which is a point on a straight line passing through a rotation center of the right and left rear wheels, and an amount of translation of the middle point using a least squares method on the basis of the measured value of the wheel speed of the right and left front wheels, the measured value of the steering angle, the distance in the traveling direction of the body of the moving object obtained from the storage device, the distance in the direction of the axles of the moving object obtained from the storage device, and the constant obtained from the storage device, the estimated amount of the rotation of the middle point and the estimated amount of the translation of the middle point being used to estimate an actual driving locus of a movement of the moving object; and
controlling the moving object based on the estimated driving locus of a movement of the moving object.

7. The method according to claim 6, wherein in a process of estimating the amount of rotation and the amount of translation, the rotation radius of the circle is calculated by assuming that the left front wheel of the right and left front wheels is connected to a first axis which changes an angle of the left front wheel, the right front wheel is connected to a second axis which changes an angle of the right front wheel, the first and second axes are connected to a third axis at a right angle, and the steering angle is converted into a displacement in the direction of the third axis.

8. The method according to claim 6, further comprising:
accumulating, by the processor, the wheel speed of the right and left front wheels measured at each specified time from a reference time of an estimation of the amount of rotation and the amount of translation until the reference time is updated;

estimating, by the processor, an average steering angle from the reference time to a latest measuring time;

estimating the amount of rotation and the amount of translation from the reference time to the latest measuring time on the basis of the accumulated wheel speed of the right and left wheels, and the average steering angle;

updating, by the processor, the reference time at the latest measuring time when the estimated amount of translation satisfies a specified condition for suppression of an increasing error of the amount of rotation or the amount of translation; and calculating, by the processor, the amount of rotation and the amount of translation of the moving object depending on the latest measuring time on the basis of the estimated amount of rotation and amount of translation.

9. The method according to claim 8, wherein the condition is that the amount of translation of the moving object from the estimated reference time to the latest measuring time is not less than a reference time update threshold; and the amount of rotation and the amount of translation of the moving object are calculated from a measuring time immediately before the latest measuring time to the latest measuring time as the amount of rotation and the amount of translation depending on the latest measuring time on the basis of the estimated amount of rotation and amount of translation.

10. The method according to claim 8, further comprising:

calculating, by the processor, a left wheel speed and a right wheel speed of the right and left front wheels backward from the amount of rotation and the amount of translation of the moving object from the estimated reference time to the latest measuring time, wherein the condition is that a difference between the backward calculated left wheel speed or right wheel speed of the right and left front wheels is within a second specified amount; and calculating, by the processor, the amount of rotation and the amount of translation of the moving object from a measuring time immediately before the latest measuring time to the latest measuring time as the amount of rotation and the amount of translation depending on the latest measuring time on the basis of the estimated amount of rotation and amount of translation.

11. A non-transitory computer-readable recording medium having stored therein a program for causing a computer to execute a process comprising:

storing, to a storage device, a distance between right and left front wheels and right and left rear wheels provided behind the front wheels in a moving object in a traveling direction of the moving object, a distance between the right and left front wheels in a direction of axles of the moving object, and a constant depending on a steering angle and a rotation radius of the moving object at the steering angle;

accepting a measured value of a wheel speed of right and left front wheels of the moving object, and a measured value of a steering angle at which the traveling direction of the moving object is changed;

estimating an amount of a rotation of a middle point of a rotation center of right and left rear wheels on a circle having a center which is a point on a straight line passing through a rotation center of the right and left rear wheels, and an amount of translation of the middle point using a least squares method on the basis of the measured value of the wheel speed of the right and left front wheels, the measured value of the steering angle, the distance in the traveling direction of the body of the moving object obtained from the storage device, the distance in the direction of the axles of the moving object obtained from the storage device, and the constant obtained from the storage device, the estimated amount of the rotation of the middle point and the estimated amount of the translation of the middle point being used to estimate an actual driving locus of a movement of the moving object; and controlling the moving object based on the estimated driving locus of a movement of the moving object.

12. The non-transitory computer-readable recording medium according to claim 11, wherein in a process of estimating the amount of rotation and the amount of translation, the rotation radius of the circle is calculated by assuming that the left front wheel of the right and left front wheels is connected to a first axis which changes an angle of the left front wheel, the right front wheel is connected to a second axis which changes an angle of the right front wheel, the first and second axes are connected to a third axis at a right angle, and the steering angle is converted into a displacement in the direction of the third axis.

13. The non-transitory computer-readable recording medium according to claim 11, wherein the process further comprising:

accumulating the wheel speed of the right and left front wheels measured at each specified time from a reference time of an estimation of the amount of rotation and the amount of translation until the reference time is updated;

estimating an average steering angle from the reference time to a latest measuring time;

estimating the amount of rotation and the amount of translation from the reference time to the latest measuring time is estimated on the basis of the accumulated wheel speed of the right and left wheels, and the average steering angle;

updating the reference time at the latest measuring time when the estimated amount of translation satisfies a specified condition for suppression of an increasing error of the amount of rotation or the amount of translation; and calculating the amount of rotation and the amount of translation of the moving object depending on the latest measuring time on the basis of the estimated amount of rotation and amount of translation.

* * * * *